United States Patent [19]

Nakamura et al.

[11] Patent Number: 5,530,579
[45] Date of Patent: Jun. 25, 1996

[54] LASER BEAM OPTICAL SCANNING DEVICE

[75] Inventors: Hiromu Nakamura; Satoru Ono; Akiyoshi Hamada, all of Toyokawa, Japan

[73] Assignee: Minolta Camera Kabushiki Kaisha, Osaka, Japan

[21] Appl. No.: 147,723

[22] Filed: Nov. 4, 1993

[30] Foreign Application Priority Data

Nov. 13, 1992 [JP] Japan .................................. 4-303688
Aug. 3, 1993 [JP] Japan .................................. 5-192621

[51] Int. Cl.$^6$ .................................................. G02B 26/08
[52] U.S. Cl. ........................... 359/216; 359/205; 359/212; 347/261
[58] Field of Search ..................................... 359/205–206, 359/207–219, 224; 346/108; 358/474; 347/259–261

[56] References Cited

U.S. PATENT DOCUMENTS 5,054,866  10/1991  Tomita et al. ...................... 359/210
5,083,138   1/1992  Nowak et al. ...................... 347/261

*Primary Examiner*—Paul M. Dzierzynski
*Assistant Examiner*—James Phan
*Attorney, Agent, or Firm*—Price, Gess & Ubell

[57] ABSTRACT

A laser beam optical scanning device which has a laser diode, a collimator lens, a cylindrical lens, a polygonal scanner and an f θ lens. The polygonal scanner is made of resin, and when the polygonal scanner is driven to rotate, the reflective facets of the polygonal scanner are distorted to be concave or convex because of a centrifugal force. If the reflective facets are distorted to be concave with rotation of the polygonal scanner, the image surface shifts along the optical axis toward the polygonal scanner. Therefore, in this case, the elements of the optical scanning device are positioned such that the image surface is located behind a light receiving surface while the polygonal scanner is stationary and is located nearer to the light receiving surface while the polygonal scanner is rotating.

7 Claims, 13 Drawing Sheets

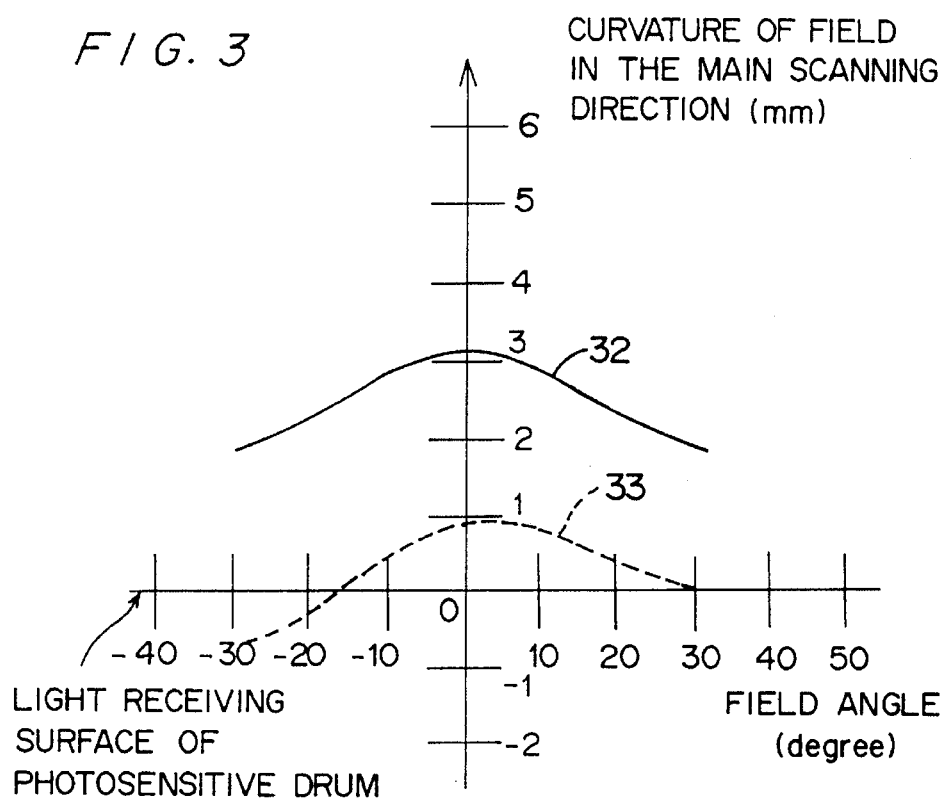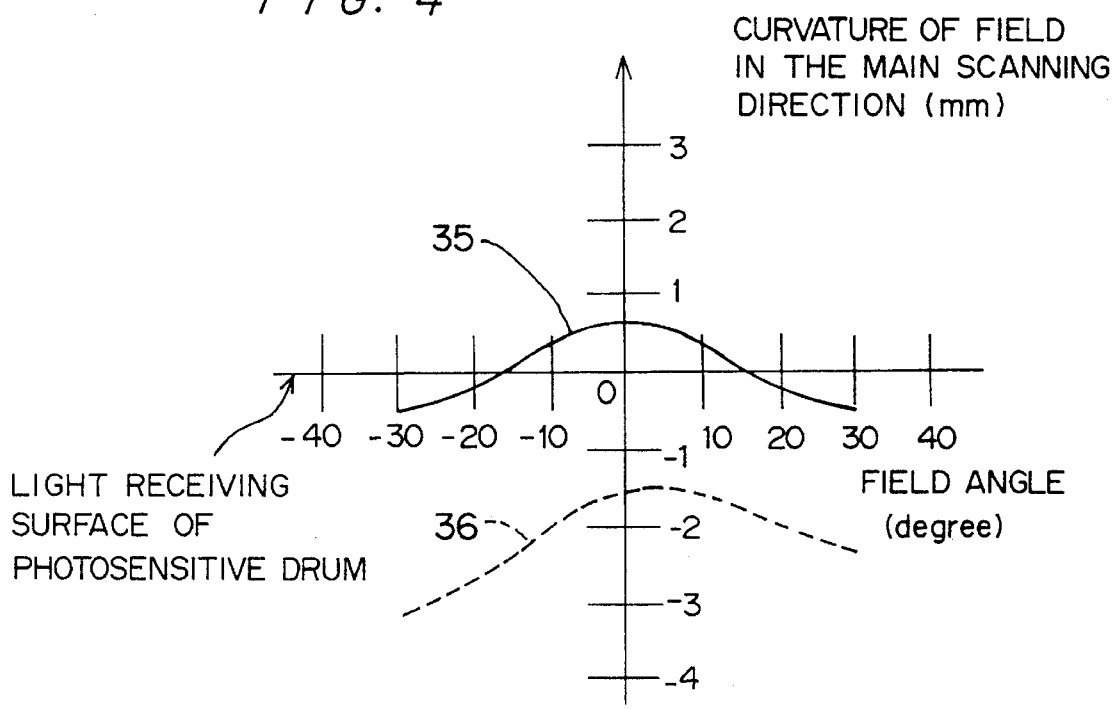

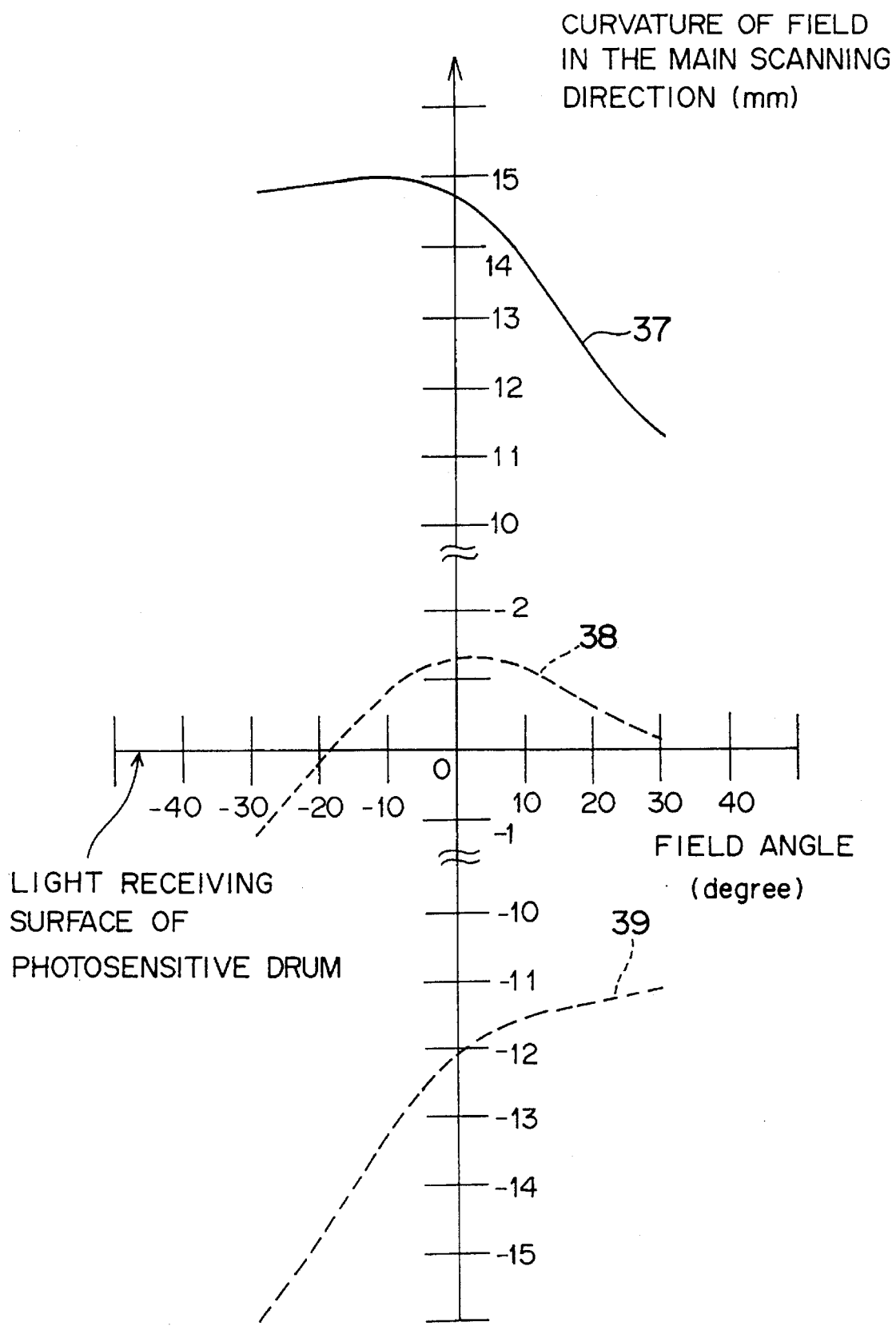
F I G. 5

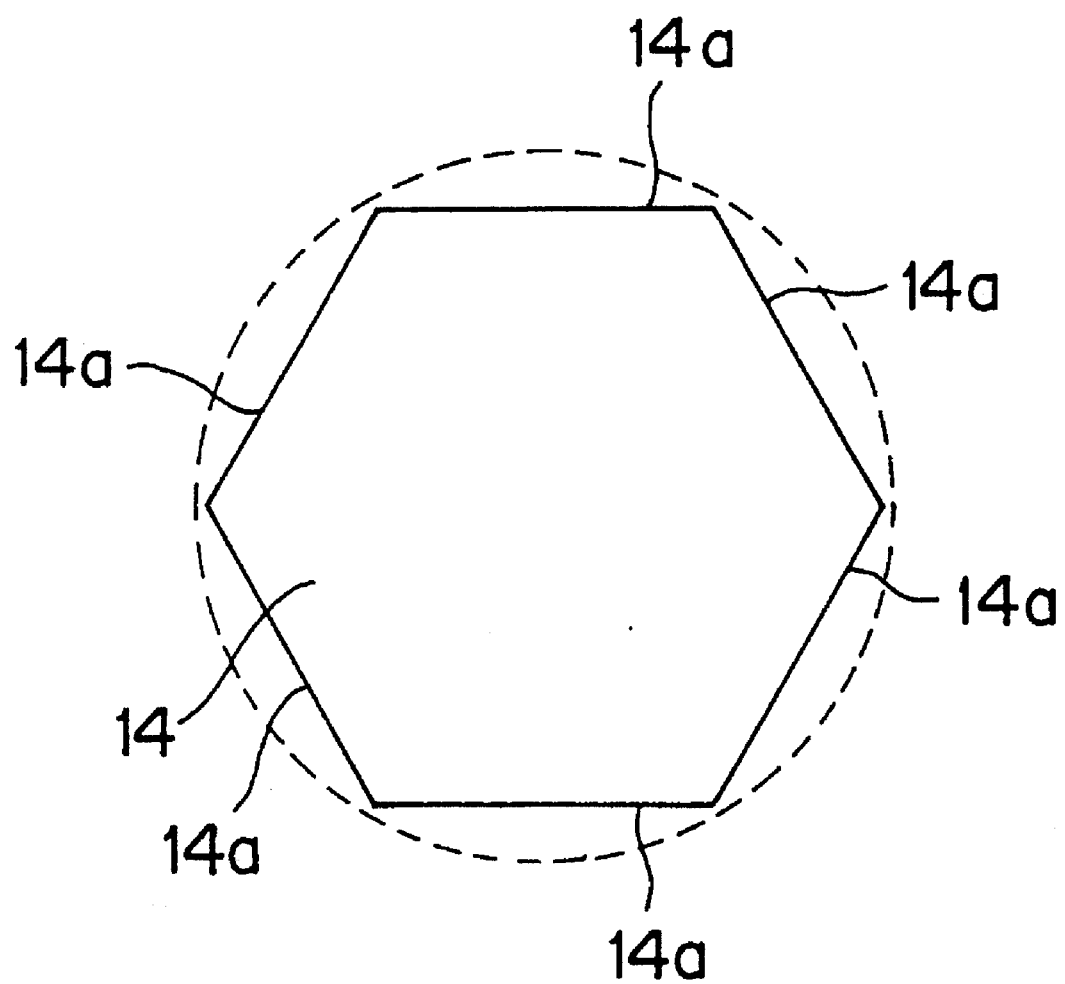
F I G. 10

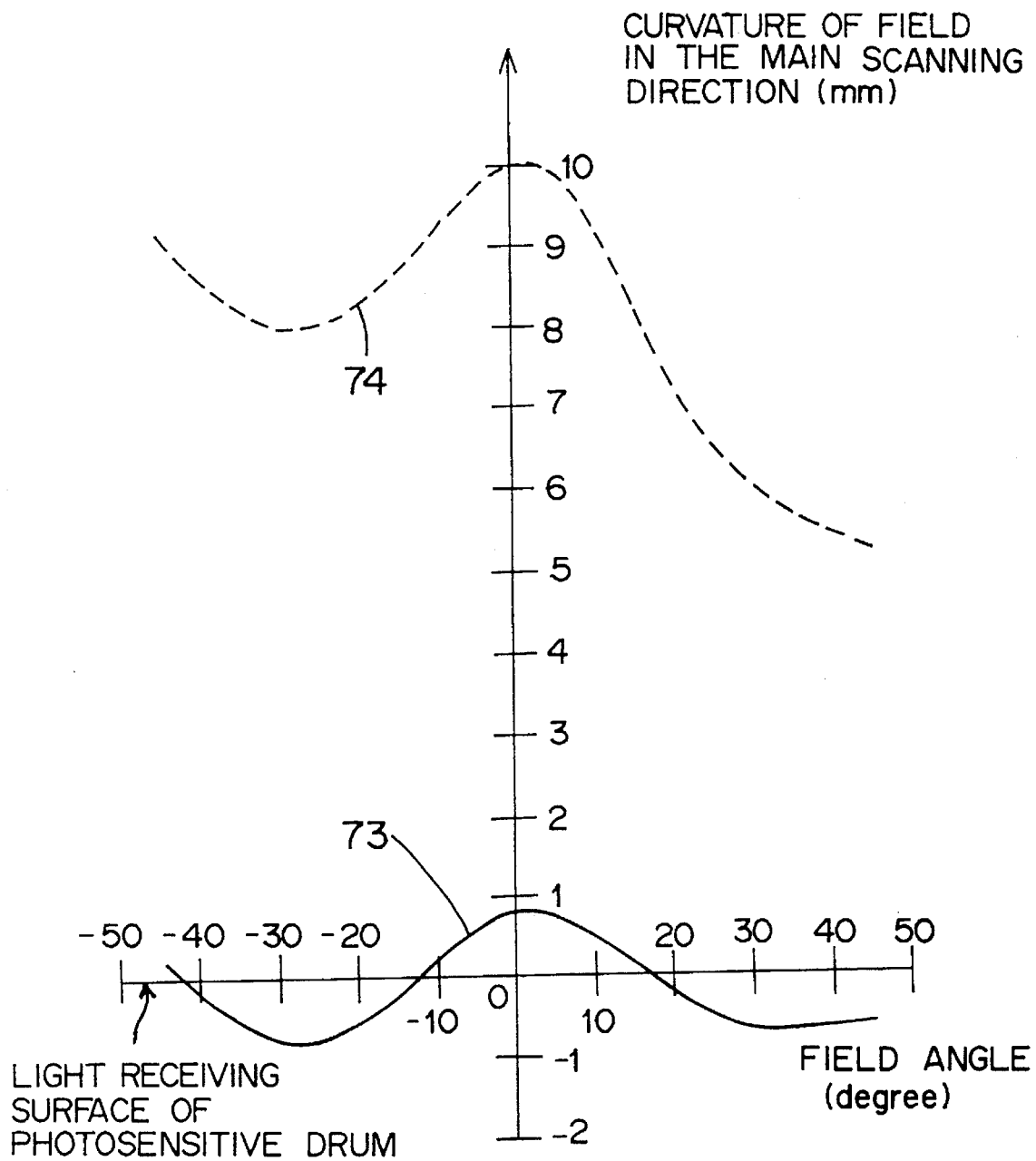

5,530,579

LASER BEAM OPTICAL SCANNING DEVICE

BACKGROUND OF THE INVENTION

1. Field of the Invention

The present invention relates to a laser beam optical scanning device, and more particularly to a laser beam optical scanning device which has a polygonal scanner and which is to be installed in an image forming apparatus such as a laser printer and a facsimile, or in an image reading apparatus.

2. Description of Related Art

Recently, it is tried in various ways to manufacture polygonal scanners from resin by an injection molding method. Using resin as the material has an advantage that by use of accurate molds, products with high accuracy can be manufactured with low cost.

However, a resin polygonal scanner has a disadvantage that when the polygonal scanner is rotated, its reflective facets are slightly distorted to be concave or convex because of the centrifugal force. This lowers the performance of the optical scanning system. More specifically, because of the distortion of the reflective facets of the polygonal scanner, the image surface is displaced from a light receiving surface of the photosensitive drum, which causes jitter and degrades the picture quality. In order to solve this problem, the polygonal scanner shall be processed into a special configuration, but this is practically impossible because it requires complicated processes and special skill.

SUMMARY OF THE INVENTION

It is an object of the present invention to provide a laser beam optical scanning device which performs excellently, that is, can form an image of good quality with no jitter, not requiring a polygonal scanner subjected to special processing.

In order to attain the object, a laser beam optical scanning device according to the present invention is so made that the beam waist of the laser beam in the main scanning direction shifts along the optical axis closer to a light receiving surface when the polygonal scanner is driven to rotate at a specified speed.

While a polygonal scanner is rotating at a high speed, its reflective facets are distorted to be slightly concave or convex because of the centrifugal force. If the reflective facets are distorted to be concave, the laser beam reflected by the reflective facets is slightly converged. Accordingly, the image surface at that time is located nearer to the polygonal scanner than the image surface while the polygonal scanner is stationary. In the light of this fact, the members of the optical scanning device are positioned such that the image surface will be located behind the light receiving surface while the polygonal scanner is stationary and will shift toward the polygonal scanner and come closer to the light receiving surface when the polygonal scanner is driven to rotate at the specified speed. Consequently, in spite of the distortion of the polygonal scanner, the performance of the optical scanning device is not degraded, that is, an image of good quality with no jitter can be formed.

If the reflective facets of the polygonal scanner are distorted to be convex with rotation of the polygonal scanner, the laser beam reflected by the reflective facets is slightly diverged. Accordingly, the image surface while the polygonal scanner is rotating is farther from the polygonal scanner than the image surface while the polygonal scanner is stationary. In the light of this fact, the members of the optical scanning device are positioned such that the image surface will be located before the light receiving surface while the polygonal scanner is stationary and will shift farther from the polygonal scanner and come closer to the light receiving surface when the polygonal scanner is driven to rotate at the specified speed. Consequently, in spite of the distortion of the polygonal scanner, the performance of the optical scanning device is not degraded, that is, an image of good quality with no jitter can be formed.

The laser beam optical scanning device further has, in an object side of the polygonal scanner, at least a lens which has a power in a main scanning direction and a power in a sub scanning direction, and a lens which has only a power in the sub scanning direction. Preferably, the lenses are movable along the optical axis. By adjusting the positions of the lenses, the position of the beam waist can be adjusted, and the adjustment does not interfere with correction of an error caused by misalignment of the reflective facets of the polygonal scanner.

Additionally, in an optical scanning device employing a polygonal scanner whose reflective facets are distorted to be concave with rotation of the polygonal scanner, preferably, the optical scanning device acts with a weaker positive power on a laser beam which is incident to a reflective facet and reflected therefrom at a larger angle. On the other hand, in an optical scanning device employing a polygonal scanner whose reflective facets are distorted to be convex with rotation of the polygonal scanner, preferably, the optical scanning device acts with a stronger positive power on a laser beam which is incident to a reflective facet and reflected therefrom at a larger angle. With this arrangement, beam waists of laser beams which are reflected from the reflective facets of the polygonal scanner at large angles will not be displaced from the light receiving surface so largely.

BRIEF DESCRIPTION OF THE DRAWINGS

This and other objects and features of the present invention will be apparent from the following description with reference to the accompanying drawings, in which:

FIG. 3 is a graph showing curvature of field which occurs in the optical scanning system of the first embodiment while the polygonal scanner is stationary and curvature of field which occurs in the same optical scanning system while the polygonal scanner is rotating at a speed of 6000 rpm;

FIG. 4 is a graph showing curvature of field which occurs in an optical scanning system of a comparative example while the polygonal scanner is stationary and curvature of field which occurs in the same optical scanning system while the polygonal scanner is rotating at a speed of 6000 rpm;

FIG. 5 is a graph showing curvature of field which occurs in an optical scanning system of the first embodiment while the polygonal scanner is stationary and curvature of field which occurs in the same optical scanning system while the polygonal scanner is rotating at a speed of 15000 rpm;

FIG. 10 is a plan view of a polygonal scanner shown in FIG. 9 which shows distortion of the polygonal scanner during its rotation;

FIG. 15 is a graph showing curvature of field which occurs in an optical scanning system of a comparative example while the polygonal scanner is stationary and curvature of field which occurs in the same optical scanning system while the polygonal scanner is rotating at a speed of 15000 rpm.

DETAILED DESCRIPTION OF THE PREFERRED EMBODIMENTS

Some embodiments of the present invention are hereinafter described with reference to the accompanying drawings.

First Embodiment: FIGS. 1–5

Figure 1:
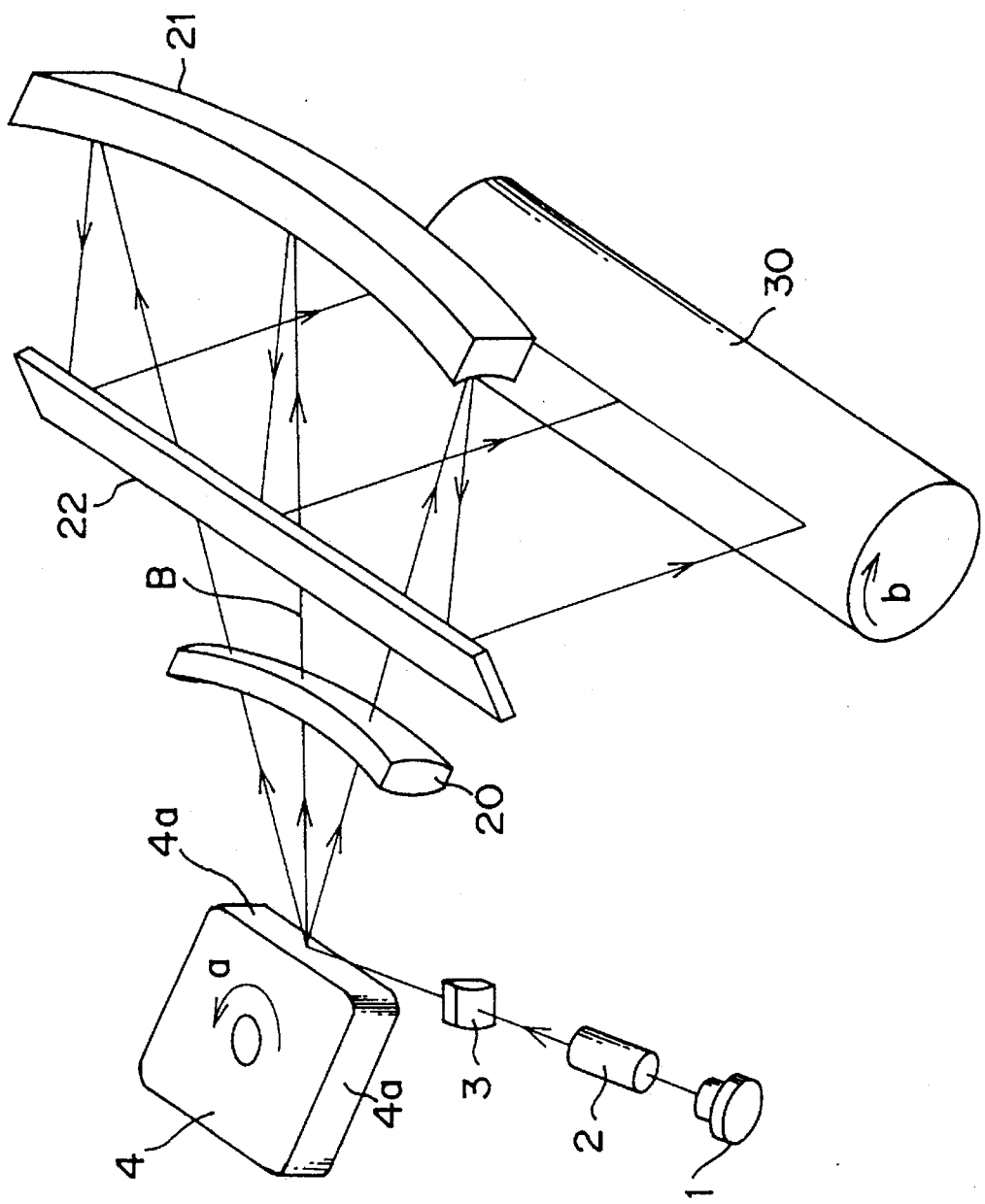
FIG. 1 is a perspective view of a laser beam optical scanning system which is a first embodiment of the present invention.

FIG. 1 shows the general structure of a laser beam optical scanning system which is a first embodiment of the present invention. The laser beam optical scanning system comprises a laser diode 1, a collimator lens 2, a cylindrical lens 3, a resin polygonal scanner 4, a toric lens 20, a spherical mirror 21 and a reflecting mirror 22.

The laser diode 1 is modulated (turned on and off) in accordance with image data stored in a control section (not shown). When the laser diode 1 is turned on, a laser beam is emitted through a cover glass of the laser diode 1. The laser beam passes through the collimator lens 2 and the cylindrical lens 3. The cylindrical lens 3 changes the spot shape of the laser beam such that the laser beam will be imaged on a reflective facet 4a of the polygonal scanner 4 in a linear form (long in a main scanning direction).

The polygonal scanner 4 is rotated in a direction of arrow a at a constant speed, and with the rotation, the laser beam is deflected in a plane perpendicular to the axis of the rotation at a constant angular velocity. Then, the deflected laser beam enters the toric lens 20. The toric lens 20 has a power in a direction in parallel with the deflection plane (main scanning direction) and a power in a direction perpendicular to the deflection plane (sub scanning direction). The toric lens 20 cooperates with the cylindrical lens 3 to correct an error in the sub scanning direction caused by misalignment of the reflective facets 4a of the polygonal scanner 4.

Then, the laser beam is reflected by the spherical mirror 21 and is imaged on a light receiving surface of a photosensitive drum 30 via the reflecting mirror 22. Image formation on the photosensitive drum 30 is carried out by main scanning resulting from the rotation of the polygonal scanner 4 in the direction of arrow a and sub scanning resulting from rotation of the photosensitive drum 30 in a direction of arrow b. The spherical mirror 21 functions to correct distortion by adjusting the main scanning speed of the laser beam and functions to correct curvature of field on the photosensitive drum 30.

Now, distortion of the resin polygonal scanner 4 during its rotation is described.

Figure 2:
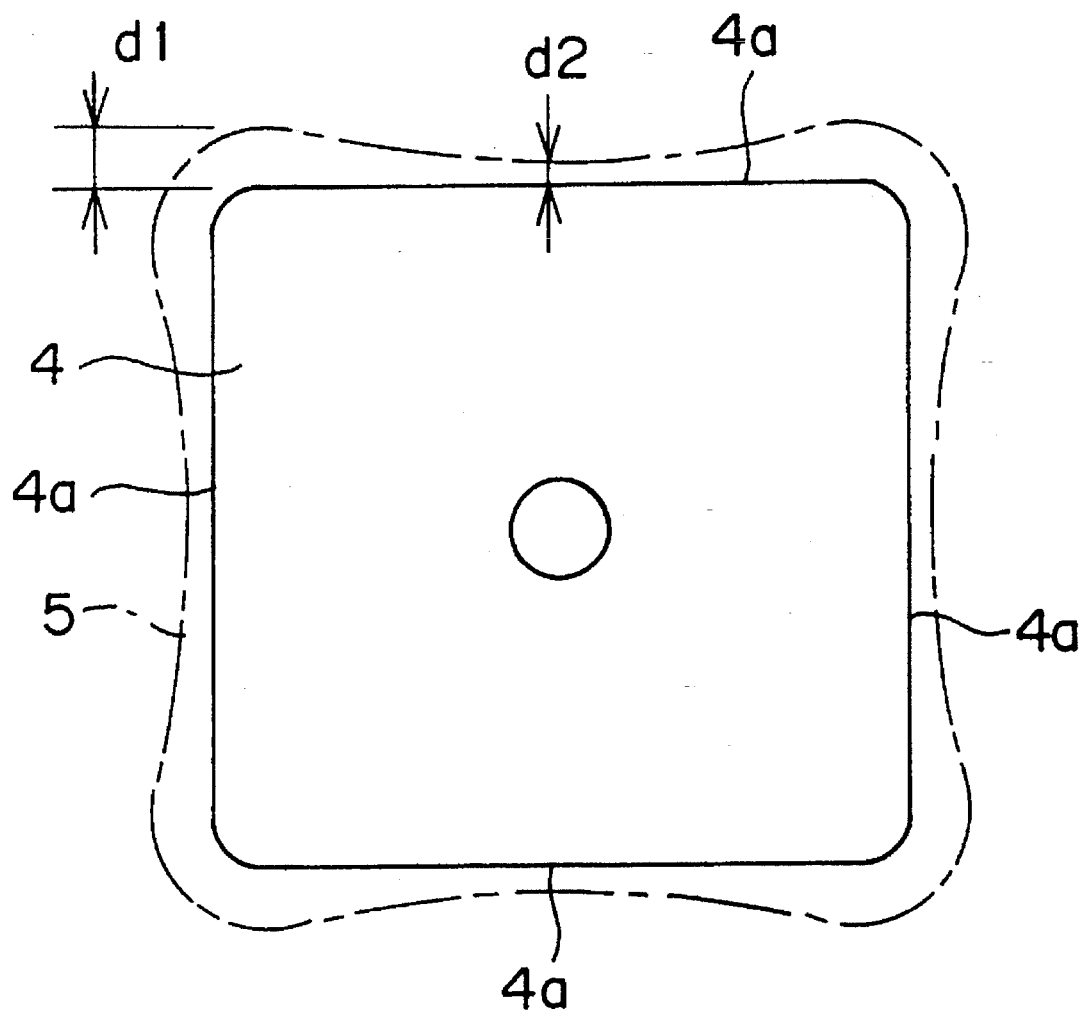
FIG. 2 is a plan view of a polygonal scanner shown in FIG. 1 which shows distortion of the polygonal scanner during its rotation.

As shown in FIG. 2, the polygonal scanner 4 has four reflective facets 4a and is a square which has sides of 30 mm. The dashed line 5 indicates the shape of the polygonal scanner 4 during its rotation. Distortion of the polygonal scanner 4 was simulated in a finite element method, and the result is shown in Table 1. Table 2 shows the characteristics of the material used for the simulation.

TABLE 1

| Rotating Speed | 6000 rpm | 15000 rpm |
|---|---|---|
| Amount of Concavity (d1–d2) | 1.5 μm | 9.5 μm |
| Radius of Curvature of Reflective Facets | −45000 mm | −7600 mm |
| Radius of Inscribed Circle | 30 mm | 30 mm |

TABLE 2

| Material | polycarbonate |
|---|---|
| Young's Modulus | 210 kg/mm$^2$ |
| Specific Gravity | 1.2 |
| Poisson's Ratio | 0.35 |

Each of the reflective facets 4a is distorted to be concave, and the amount of concavity in Table 1 means the difference between the maximum value d1 and the minimum value d2 of the distortion (see FIG. 2).

The concave distortion of the reflective facets 4a influences the location of the image surface in the main scanning direction most. With the concave distortion, each of the reflective facets 4a obtains a positive power in the main scanning direction. Accordingly, the laser beam reflected by the reflective facets 4a becomes convergent, and consequently, the image surface in the main scanning direction shifts in a minus direction (toward the polygonal scanner 4). Thus, the image surface in the main scanning direction and that in the sub scanning direction come to disagree with each other. If the amount of the concavity becomes larger, the image surface will be inclined in the main scanning direction, and the scanning performance will be lowered, that is, curvature of field and distortion will be larger. Since the distortion becomes larger in a plus direction, the magnification (scanning width) in the main scanning direction will be larger.

The distortion of the image surface caused by the concave distortion of the reflective facets 4a of the polygonal scanner 4 can be calculated beforehand, and it is possible to design an f θ system which causes opposite distortion which will offset the distortion. By increasing the power in the sub scanning direction, the disagreement between the image surface in the sub scanning direction and that in the main scanning direction can be prevented. The inclination of the image surface can be corrected by decentering the f θ system in the main scanning direction.

It is not always necessary to carry out all these corrections. Corrections are necessary at least to things which are largely influenced by the distortion of the reflective facets 4a. For example, only the correction to the distortion is considered on the designing stage, and the shift of the image surface in the main scanning direction is corrected after assembly of the scanning system.

Preferred positions of the elements of the optical scanning system which has the polygonal scanner 4, whose characteristics are shown in Table 1 and Table 2, and the photosensitive drum 30 were studied. Table 3 shows a preferred positional relation among these members such that the image surface of the optical scanning system will shift closer to the light receiving surface of the photosensitive drum 30 when the polygonal scanner 4 is driven to rotate at a speed of 6000 rpm.

The data shown in Table 3 are values which were measured while the polygonal scanner 4 is stationary. While the polygonal scanner 4 is rotating at a speed of 6000 rpm, the radius of curvature of the reflective facets 4a of the polygonal scanner 4 is −45000 mm (see Table 1).

TABLE 3

| Elements | Radius of Curvature (mm) | | Distance (mm) | Refractive Index |
|---|---|---|---|---|
| | main scanning direction | sub scanning direction | | |
| laser diode | | | | |
| | | | 0.48 | 1.0 (air) |
| | infinite | | | |
| cover glass of laser diode | | | 0.25 | 1.51118 (glass) |
| | infinite | | | |
| | | | 5.86045 | 1.0 (air) |
| | infinite | | | |
| collimator lens | | | 2.8 | 1.78571 (SF6) |
| | −6.286 | | | |
| | | | 224.432 | 1.0 (air) |
| | infinite | 14.537 | | |
| cylindrical lens | | | 1.5 | 1.48457 (AC) |
| | infinite | | | |
| | | | 28.25 | 1.0 (air) |
| polygonal scanner | infinite (reflective facets) | | | |
| | | | 40 | 1.0 (air) |
| | −50.962 | 29.25 | | |
| toric lens | | | 8 | 1.48457 (AC) |
| | −54.561 | | | |
| | | | 95 | 1.0 (air) |

TABLE 3-continued

| Elements | Radius of Curvature (mm) | | Distance (mm) | Refractive Index |
|---|---|---|---|---|
| | main scanning direction | sub scanning direction | | |
| spherical mirror | −480 (reflective surface) | | | |
| | | | 165 | 1.0 (air) |
| photosensitive drum | | | | |

(for rotation of 6000 rpm, in a stationary state)

The light emergent side of the collimator lens 2 is aspherical and defined as follows:

$$x = \frac{C_o \Phi^2}{1 + \sqrt{1 - \epsilon C_o^2 \Phi^2}} + \Sigma A_i \Phi_i \quad (1)$$

x: position in a direction of the optical axis

Φ: height from the optical axis

ε: quadratic curve parameter $C_o$: paraxial curvature $A_1$: high-order parameter (aspherical coefficients from second order to sixteenth order $A_2$ through $A_{16}$)

By substituting the following aspherical data (2) and −6.286 mm, which is indicated in Table 3 as the radius of curvature ($1/C_o$) of the emergent side of the collimator lens 2, into the expression (1), the emergent side of the collimator lens 2 can be embodied.

$$\left.\begin{aligned} &\epsilon = 1 \\ &A_4 = 0.3270123 \times 10^{-3} \\ &A_6 = 0.66745302 \times 10^{-5} \\ &A_8 = 0.10868358 \times 10^{-6} \\ &A_{10} = 0.23540305 \times 10^{-8} \\ &\text{The aspherical coefficients} \\ &A_2 \text{ through } A_{16} \text{ other than} \\ &\text{the above are 0.} \end{aligned}\right\} \quad (2)$$

In the optical scanning system shown by Table 3, the toric lens 20 is set such that the vertex of its light incident side is −0.21 mm out of the optical axis in the main scanning direction and such that the vertex of its light emergent side is −0.5 mm out of the optical axis in the main scanning direction and −9 mm out of the optical axis in the sub scanning direction. Additionally, the spherical mirror 21 is set such that the vertex of its reflective surface is −10.3 mm out of the optical axis in the sub scanning direction.

Next, the operation and effect of the laser beam optical scanning system whose elements are positioned as shown in Table 3 are described.

In the optical scanning system, the laser beam incident to the polygonal scanner 4 is a slightly divergent pencil of rays. While the polygonal scanner 4 is stationary, the image surface is behind the light receiving surface of the photosensitive drum 30. While the polygonal scanner 4 is rotating at a speed of 6000 rpm, the reflective facets 4a of the polygonal scanner 4 are distorted to be concave, and thereby the laser beam reflected from the polygonal scanner 4 is collimated and is incident to the toric lens 20 as substantially a parallel pencil of rays. Consequently, the image surface shifts toward the polygonal scanner 4 in the direction of the optical axis and comes closer to the light receiving surface of the photosensitive drum 30.

Table 4 and Table 5 show curvature of field which occurs in the optical scanning system of Table 3 while the polygonal scanner 4 is stationary and while the polygonal scanner 4 is rotating at a speed of 6000 rpm respectively. In Table 4 and Table 5, a field angle means the angle of the laser beam to the optical axis B in the main scanning direction, and a scanning start side and a scanning end side with the optical axis B in the center are indicated with positive values and negative values respectively. The curvature of field is shown by listing the distances between the image points of laser beams at the respective field angles and the light receiving surface of the photosensitive drum 30. When the image point is behind the light receiving surface of the photosensitive drum 30 in the direction of the optical axis, the distance is indicated as a positive value. When the image point is before the light receiving surface of the photosensitive drum 30, the distance is indicated as a negative value.

TABLE 4

| Field Angle (degrees) | Curvature of Field in the Sub Scanning Direction (mm) | Curvature of Field in the Main Scanning Direction (mm) |
| --- | --- | --- |
| −30.00 | −1.3099 | 1.8602 |
| −25.00 | −0.0257 | 1.9577 |
| −20.00 | 0.7426 | 2.2174 |
| −15.00 | 1.0880 | 2.5332 |
| −10.00 | 1.0983 | 2.8248 |
| −5.00 | 0.8570 | 3.0347 |
| 0.00 | 0.4448 | 3.1268 |
| 5.00 | −0.0603 | 3.0857 |
| 10.00 | −0.5816 | 2.9165 |
| 15.00 | −1.0434 | 2.6466 |
| 20.00 | −1.3693 | 2.3259 |
| 25.00 | −1.4811 | 2.0303 |
| 30.00 | −1.2973 | 1.8645 |

(for rotation of 6000 rpm, in a stationary state)

TABLE 5

| Field Angle (degrees) | Curvature of Field in the Sub Scanning Direction (mm) | Curvature of Field in the Main Scanning Direction (mm) |
| --- | --- | --- |
| −30.00 | −1.3221 | −0.8221 |
| −25.00 | −0.0338 | −0.6309 |
| −20.00 | 0.7374 | −0.2855 |
| −15.00 | 1.0848 | 0.1100 |
| −10.00 | 1.0963 | 0.4768 |
| −5.00 | 0.8556 | 0.7586 |
| 0.00 | 0.4434 | 0.9198 |
| 5.00 | −0.0619 | 0.9457 |
| 10.00 | −0.5839 | 0.8420 |
| 15.00 | −1.0465 | 0.6356 |
| 20.00 | −1.3734 | 0.3770 |
| 25.00 | −1.4864 | 0.1419 |
| 30.00 | −1.3044 | 0.0344 |

(in a state of 6000 rpm rotation)

FIG. 3 is a graph drawn from the data about the curvature of field in the main scanning direction provided in Table 4 and Table 5. In FIG. 3, the solid line 32 shows the curvature of field while the polygonal scanner 4 is stationary, and the dashed line 33 shows the curvature of field while the polygonal scanner 4 is rotating at a speed of 6000 rpm.

As is apparent from FIG. 3, while the polygonal scanner 4 is stationary, the curvature of field in the main scanning direction is large, but the curvature of field becomes small when the polygonal scanner 4 is driven to rotate. The difference is approximately 2 mm. On the other hand, the curvature of field in the sub scanning direction hardly changes and is always small whether the polygonal scanner 4 is stationary or rotates (see Table 4 and Table 5). Thus, in the laser beam optical scanning system of the first embodiment, when the polygonal scanner 4 is driven for image formation, the curvature of field becomes small enough such that an image of high quality with no jitter can be obtained.

For comparison, an optical scanning system whose elements are positioned such that the image surface is close to the light receiving surface of the photosensitive drum 30 while the polygonal scanner 4 is stationary is described. Table 6 shows positions of the elements of this comparative optical scanning system. Values indicated in Table 6 were measured while the polygonal scanner 4 is stationary. While the polygonal scanner 4 is rotating at a speed of 6000 rpm, the radius of curvature of the polygonal scanner 4 is −45000 mm (see Table 1).

TABLE 6

| Elements | Radius of Curvature (mm) | | Distance (mm) | Refractive Index |
| --- | --- | --- | --- | --- |
| | main scanning direction | sub scanning direction | | |
| laser diode | | | | |
| | | | 0.48 | 1.0 (air) |
| | infinite | | | |
| cover glass of laser diode | | | 0.25 | 1.51118 (glass) |
| | infinite | | | |
| | | | 5.86245 | 1.0 (air) |
| | infinite | | | |
| collimator lens | | | 2.8 | 1.78571 (SF6) |
| | −6.286 | | | |
| | | | 224.48 | 1.0 (air) |
| | infinite | 14.537 | | |
| cylindrical lens | | | 1.5 | 1.48457 (AC) |
| | infinite | | | |
| | | | 28.2 | 1.0 (air) |
| polygonal scanner | infinite (reflective facets) | | | |
| | | | 40 | 1.0 (air) |
| toric lens | −50.962 | 29.25 | 8 | 1.48457 (AC) |
| | −54.561 | | | |
| | | | 95 | 1.0 (air) |
| spherical mirror | −480 (reflective surface) | | | |
| | | | 165 | 1.0 (air) |
| photo-sensitive drum | | | | |

(comparative example, in a stationary state)

As is apparent from Table 3 and Table 6, in the comparative example, the collimator lens 2 and the cylindrical lens 3 are positioned closer to the polygonal scanner 4 than those in the first embodiment by 0.002 mm and 0.05 mm respectively. In the optical scanning system of the comparative example, while the polygonal scanner 4 is stationary, the laser beam reflected from the polygonal scanner 4 and incident to the toric lens 20 is substantially a parallel pencil of rays. Accordingly, the image surface is substantially on the light receiving surface of the photosensitive drum 30. When the polygonal scanner 4 is driven to rotate, the laser beam incident to the toric lens 20 becomes a slightly convergent pencil of rays because of distortion of the polygonal scanner 4. Accordingly, the image surface shifts toward the polygonal scanner 4 along the optical axis, that is, comes before the light receiving surface of the photosensitive drum 30.

Table 7 and Table 8 show curvature of field which occurs in the optical scanning system of the comparative example while the polygonal scanner 4 is stationary and while the polygonal scanner 4 is rotating at a speed of 6000 rpm respectively.

TABLE 7

| Field Angle (degrees) | Curvature of Field in the Sub Scanning Direction (mm) | Curvature of Field in the Main Scanning Direction (mm) |
|---|---|---|
| −30.00 | −1.2193 | −0.8602 |
| −25.00 | 0.0645 | −0.4488 |
| −20.00 | 0.8323 | −0.2191 |
| −15.00 | 1.1772 | 0.0729 |
| −10.00 | 1.1869 | 0.3474 |
| −5.00 | 0.9451 | 0.5473 |
| 0.00 | 0.5324 | 0.6367 |
| 5.00 | 0.0270 | 0.6003 |
| 10.00 | −0.4945 | 0.4431 |
| 15.00 | −0.9562 | 0.1919 |
| 20.00 | −1.2816 | −0.1036 |
| 25.00 | −1.3927 | −0.3685 |
| 30.00 | −1.2082 | −0.4991 |

(comparative example, in a stationary state)

TABLE 8

| Field Angle (degrees) | Curvature of Field in the Sub Scanning Direction (mm) | Curvature of Field in the Main Scanning Direction (mm) |
|---|---|---|
| −30.00 | −1.2303 | −3.1717 |
| −25.00 | 0.0576 | −3.0144 |
| −20.00 | 0.8283 | −2.6981 |
| −15.00 | 1.1751 | −2.3259 |
| −10.00 | 1.1860 | −1.9761 |
| −5.00 | 0.9447 | −1.7047 |
| 0.00 | 0.5321 | −1.5466 |
| 5.00 | 0.0265 | −1.5168 |
| 10.00 | −0.4956 | −1.6097 |
| 15.00 | −0.9581 | −1.7985 |
| 20.00 | −1.2846 | −2.0334 |
| 25.00 | −1.3968 | −2.2395 |
| 30.00 | −1.2136 | −2.3136 |

(comparative example, in a state of 6000 rpm rotation)

FIG. 4 is a graph drawn from the data about the curvature of field in the main scanning direction provided in Table 7 and Table 8. In FIG. 4, the solid line 35 shows the curvature of field while the polygonal scanner 4 is stationary, and the dashed line 36 shows the curvature of field while the polygonal scanner 4 is rotating at a speed of 6000 rpm.

As is apparent from FIG. 4, the curvature of field in the main scanning direction is small while the polygonal scanner 4 is stationary, and when the polygonal scanner 4 is driven to rotate, the curvature of field becomes large. Thus, in the optical scanning system of the comparative example, when the polygonal scanner 4 is driven for image formation, the curvature of field becomes larger. In other words, the performance of this optical scanning system is not sufficient to form an image of good quality with no jitter. By changing the positions of the collimator lens 2 and the cylindrical lens 3 so as to have the positional relations shown in Table 3, the optical scanning system of the first embodiment which has sufficient performance can be obtained.

Table 9 shows a preferred positional relation among the elements of an optical scanning system, including the polygonal scanner 4 with the characteristics indicated in Table 1 and Table 2, and the photosensitive drum 30 such that the image surface will be very near the light receiving surface of the photosensitive drum 30 while the polygonal scanner 4 is rotating at a speed of 15000 rpm.

Values provided in Table 9 were measured while the polygonal scanner 4 is stationary. While the polygonal scanner 4 is rotating at a speed of 15000 rpm, the radius of curvature of the polygonal scanner 4 is −7600 mm (see Table 1).

TABLE 9

| Elements | Radius of Curvature (mm) | | Distance (mm) | Refractive Index |
|---|---|---|---|---|
| | main scanning direction | sub scanning direction | | |
| laser diode | | | 0.48 | 1.0 (air) |
| | infinite | | | |
| cover glass of laser diode | | | 0.25 | 1.51118 (glass) |
| | infinite | | | |
| | infinite | | 5.85045 | 1.0 (air) |
| collimator lens | | | 2.8 | 1.78571 (SF6) |
| | −6.286 | | | |
| | | | 224.492 | 1.0 (air) |
| | infinite | 14.537 | | |
| cylindrical lens | | | 1.5 | 1.48457 (AC) |
| | infinite | | | |
| | | | 28.25 | 1.0 (air) |
| polygonal scanner | infinite (reflective facets) | | | |
| | | | 40 | 1.0 (air) |
| | −50.962 | 29.00 | | |
| toric lens | | | 8 | 1.48457 (AC) |
| | −54.561 | | | |
| | | | 95 | 1.0 (air) |
| spherical mirror | −480 (reflective surface) | | | |
| | | | 165 | 1.0 (air) |
| photo-sensitive drum | | | | |

(for rotation of 15000 rpm, in a stationary state)

The light emergent side of the collimator lens 2 has the same configuration of that of the optical scanning system shown in Table 3. The toric lens 20 is set such that the vertex of its light incident side is −0.21 mm out of the optical axis in the main scanning direction and such that the vertex of its light emergent side is −1.5 mm out of the optical axis in the main scanning direction and −9 mm out of the optical axis in the sub scanning direction. Additionally, the spherical mirror 21 is set such that the vertex of its reflective surface is −10.3 mm out of the optical axis in the sub scanning direction.

The operation and effect of the laser beam optical scanning system whose elements are positioned as shown in Table 9 are the same as those of the optical scanning system shown in Table 3. Table 10 and Table 11 show curvature of field which occurs in the optical scanning system of Table 9 while the polygonal scanner 4 is stationary and while the polygonal scanner 4 is rotating at a speed of 15000 rpm respectively.

TABLE 10

| Field Angle (degrees) | Curvature of Field in the Sub Scanning Direction (mm) | Curvature of Field in the Main Scanning Direction (mm) |
|---|---|---|
| −30.00 | 0.1119 | 14.7971 |
| −25.00 | 1.2986 | 14.7935 |
| −20.00 | 1.9494 | 14.8913 |
| −15.00 | 2.1625 | 14.9907 |
| −10.00 | 2.0308 | 15.0188 |
| −5.00 | 1.6427 | 14.9266 |
| 0.00 | 1.0826 | 14.6870 |
| 5.00 | 0.4321 | 14.2936 |
| 10.00 | −0.2297 | 13.7606 |
| 15.00 | −0.8250 | 13.1236 |
| 20.00 | −1.2762 | 12.4412 |
| 25.00 | −1.5045 | 11.7970 |
| 30.00 | −1.4290 | 11.3030 |

(for rotation of 15000 rpm, in a stationary state)

TABLE 11

| Field Angle (degrees) | Curvature of Field in the Sub Scanning Direction (mm) | Curvature of Field in the Main Scanning Direction (mm) |
|---|---|---|
| −30.00 | 0.2348 | −1.2147 |
| −25.00 | 1.4153 | −0.6989 |
| −20.00 | 2.0519 | −0.1248 |
| −15.00 | 2.2444 | 0.4193 |
| −10.00 | 2.0870 | 0.8686 |
| −5.00 | 1.6691 | 1.1800 |
| 0.00 | 1.0761 | 1.3307 |
| 5.00 | 0.3904 | 1.3171 |
| 10.00 | −0.3084 | 1.1556 |
| 15.00 | −0.9419 | 0.8830 |
| 20.00 | −1.4319 | 0.5580 |
| 25.00 | −1.6995 | 0.2641 |
| 30.00 | −1.6632 | 0.1121 |

(in a state of 15000 rpm rotation)

FIG. 5 is a graph drawn from the data about the curvature of field in the main scanning direction provided in Table 10 and Table 11. In FIG. 5, the solid line 37 shows the curvature of field while the polygonal scanner 4 is stationary, and the dashed line 38 shows the curvature of field while the polygonal scanner 4 is rotating at a speed of 15000 rpm.

Further, the polygonal scanner 4 of the optical scanning system of the comparative example shown in Table 6 is rotated at a speed of 15000 rpm, and curvature of field which occurs at that time is shown in Table 12 and by the dashed line 39 in FIG. 5.

TABLE 12

| Field Angle (degrees) | Curvature of Field in the Sub Scanning Direction (mm) | Curvature of Field in the Main Scanning Direction (mm) |
|---|---|---|
| −30.00 | −1.2846 | −15.9727 |
| −25.00 | 0.0236 | −15.3409 |
| −20.00 | 0.8087 | −14.5986 |
| −15.00 | 1.1650 | −13.8370 |
| −10.00 | 1.1816 | −13.1255 |
| −5.00 | 0.9431 | −12.5138 |
| 0.00 | 0.5309 | −12.0322 |
| 5.00 | 0.0238 | −11.6923 |
| 10.00 | −0.5012 | −11.4865 |
| 15.00 | −0.9677 | −11.3868 |
| 20.00 | −1.2991 | −11.3430 |
| 25.00 | −1.4171 | −11.2809 |
| 30.00 | −1.2403 | −11.0938 |

TABLE 12-continued

| Field Angle (degrees) | Curvature of Field in the Sub Scanning Direction (mm) | Curvature of Field in the Main Scanning Direction (mm) |
|---|---|---|

(comparative example, in a state of 15000 rpm rotation)

The following describes how to adjust the laser beam optical scanning system so as to perform sufficiently to form an image of good quality with no jitter in spite of the distortion of the polygonal scanner 4 with its rotation.

In a first way, while the polygonal scanner 4 is rotating, the diameter of a beam spot is measured, and adjustment is carried out. The polygonal scanner 4 is driven to rotate at an usual speed in use (6000 rpm or 15000 rpm). A driving signal is sent to the laser diode 1 in synchronization with an image writing start signal, and accordingly, the laser diode 1 emits a laser beam for one dot. The beam spot of the laser beam is monitored by a monitor camera which is disposed in a place corresponding to the light receiving surface of the photosensitive drum 30. The diameter of the beam spot is measured by counting picture elements of the monitor camera which receive luminous intensities not less than $1/e^2$ of the peak intensity and multiplying the number by the length of a side of one picture element. While the beam spot is monitored in this way, first, the position of the collimator lens 2 is adjusted such that the diameter of the beam spot in the main scanning direction will be within a specified value. Since the collimator lens 2 has not only a power in the main scanning direction but also a power in the sub scanning direction, the diameter of the beam spot in the sub scanning direction may get over a specified value with this adjustment. In this case, the position of the cylindrical lens 3, which has a power only in the sub scanning direction, is adjusted such that the diameter of the beam spot in the sub scanning direction will be within the specified value. In this way, the optical scanning system is adjusted, and the diameter of the beam spot in the main scanning direction and that in the sub scanning direction are within the respective specified values.

In the above-described way, the monitor camera is disposed in a place corresponding to the light receiving surface of the photosensitive drum 30. For more accurate monitoring, however, the following camera setting is possible. The monitor camera is disposed behind the light receiving surface, and a lens is disposed between the light receiving surface and the monitor camera such that the beam spot on the light receiving surface will be magnified and projected on the monitor camera.

In a second way, while the polygonal scanner 4 is stationary, the diameter of a beam spot is measured, and adjustment is carried out. As described above, the amount of a shift of the image surface caused by rotation of the polygonal scanner 4 can be calculated by simulation. The monitor camera is disposed behind a place corresponding to the light receiving surface of the photosensitive drum 30 by the calculated amount. While a beam spot is monitored with the monitor camera, the positions of the collimator lens 2 and the cylindrical lens 3 are adjusted such that the diameter of the beam spot in the main scanning direction and that in the sub scanning direction will be within the respective specified values. Thus, the optical scanning system is adjusted. In mass production, only several samples of optical scanning systems are subjected to the adjustment in these two ways. Others are assembled in accordance with collected data.

In the above two adjusting ways, the position of the beam waist is adjusted by moving the lenses 2 and 3 which are in the object side of the polygonal scanner 4 along the optical axis, and the adjustment does not weaken the effect of the lenses 2 and 3 of correcting an error caused by misalignment of the reflective facets 4a of the polygonal scanner 4. More specifically, the concave distortion of the reflective facets 4a of the polygonal scanner 4 with rotation of the polygonal scanner 4 moves the beam waist in respect to the main scanning direction in a minus direction. As measures to prevent this, the collimator lens 2 is moved in the minus direction along the optical axis such that the laser beam will be incident to the reflective facets 4a as a slightly divergent pencil of rays. Accordingly, the beam waist in the main scanning direction while the polygonal scanner 4 is stationary shifts in the plus direction (behind the light receiving surface). In this condition, when the polygonal scanner 4 is driven to rotate, the beam waist in the main scanning direction comes closer to the light receiving surface. However, since the collimator lens 2 has a power in the sub scanning direction as well as a power in the main scanning direction, this adjustment also shifts the beam waist in the sub scanning direction. In order to offset the shift of the beam waist in the sub scanning direction, the cylindrical lens 3 which has a power only in the sub scanning direction is moved along the optical axis. Thus, the beam waist in the sub scanning direction can be kept close to the light receiving surface.

As described, if the position of the beam waist in the main scanning direction is adjusted by moving a lens which is disposed in the object side of the polygonal scanner 4 and has powers both in the main scanning direction and in the sub scanning direction, it is preferred that the position of the beam waist in the sub scanning direction is adjusted by moving a lens which is disposed in the object side of the polygonal scanner 4 and has a power only in the sub scanning direction. More specifically, the position of the beam waist in the sub scanning direction is adjusted preferably by moving the cylindrical lens 3. When the cylindrical lens 3 is set in such a position that the beam waist in the sub scanning direction comes closer to the light receiving surface, the image point of the laser beam emergent from the cylindrical lens 3 comes closer to the reflective facet 4a of the polygonal scanner 4, and an error caused by misalignment of the reflective facets 4a can be certainly corrected.

Although adjustment of the laser beam optical scanning system have been described in connection with the above two ways, it is to be noted that other ways are possible. Any method may be adopted as long as the method can correct the shift of the image surface caused by the distortion of the polygonal scanner 4 with its rotation.

Figure 6:
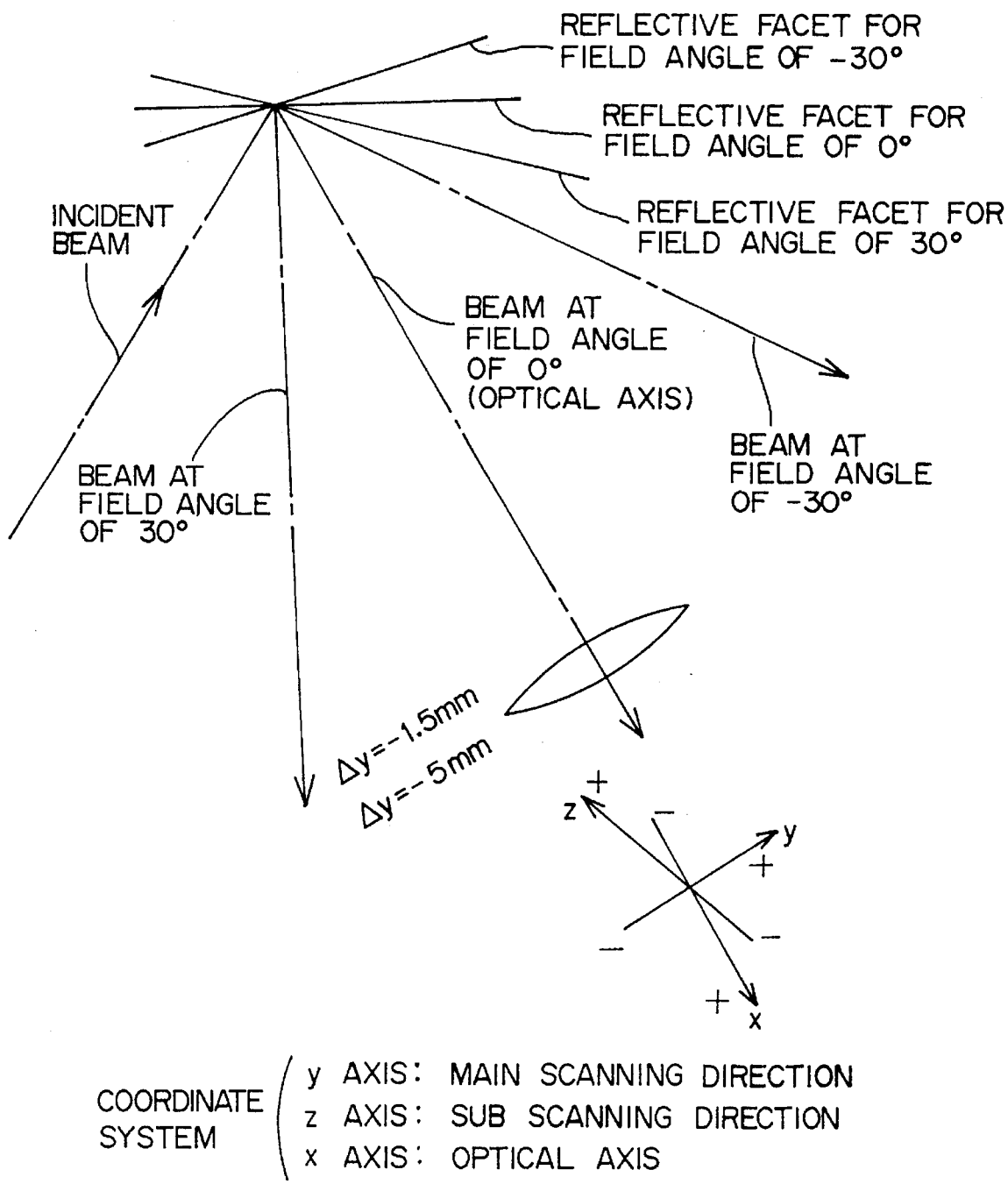
FIG. 6 is an explanatory view which explains the postures of a reflective facet of the polygonal scanner and incidence and emergence of laser beams at different field angles to and from the reflective facet.

When the reflective facets 4a of the polygonal scanner 4 are distorted to be concave with rotation of the scanner 4, the reflective facets 4a have a larger power (converge the laser beam more strongly) toward a laser beam at a field angle of −30 degrees than toward a laser beam at a field angle of 30 degrees. Accordingly, the beam waist of the laser beam at a field angle of −30 degrees is located in the minus side of that of the laser beam at a field angle of 30 degrees along the optical axis. This is apparent from the dashed line 39 in the graph of FIG. 5 and Table 12. In order to correct the inclination of the image surface, in the optical scanning system shown by Table 9, the vertex of the light emergent side of the toric lens 20 is decentered by −1.5 mm toward the laser beam incident to the polygonal scanner 4 as shown in FIG. 6.

The solid line 37 in the graph of FIG. 5 and Table 10 show the positions of beam waists in the above-described structure while the polygonal scanner 4 is stationary. The beam waist of a laser beam at a field angle of −30 degrees is displaced from the light receiving surface in the plus direction more largely than that of a laser beam at a field angle of 30 degrees. Thereby, while the polygonal scanner 4 is rotating, the beam waist of the laser beam at a field angle of −30 degrees is not displaced in the minus direction so largely (see the dashed line 38 in FIG. 5). In other words, the laser beam at a field angle of −30 degrees is converged by the toric lens 20 less strongly than the laser beam of a field angle of 30 degrees such that displacement of the beam waist of the laser beam at a field angle of 30 degrees and that of the beam waist of the laser beam at a field angle of −30 degrees will be almost in the same degree. The larger the angle between the laser beam incident to a reflective facet 4a and the laser beam reflected therefrom is, the smaller the positive power of the toric lens 20 acting on the laser beam in the main scanning direction is.

Figure 7:
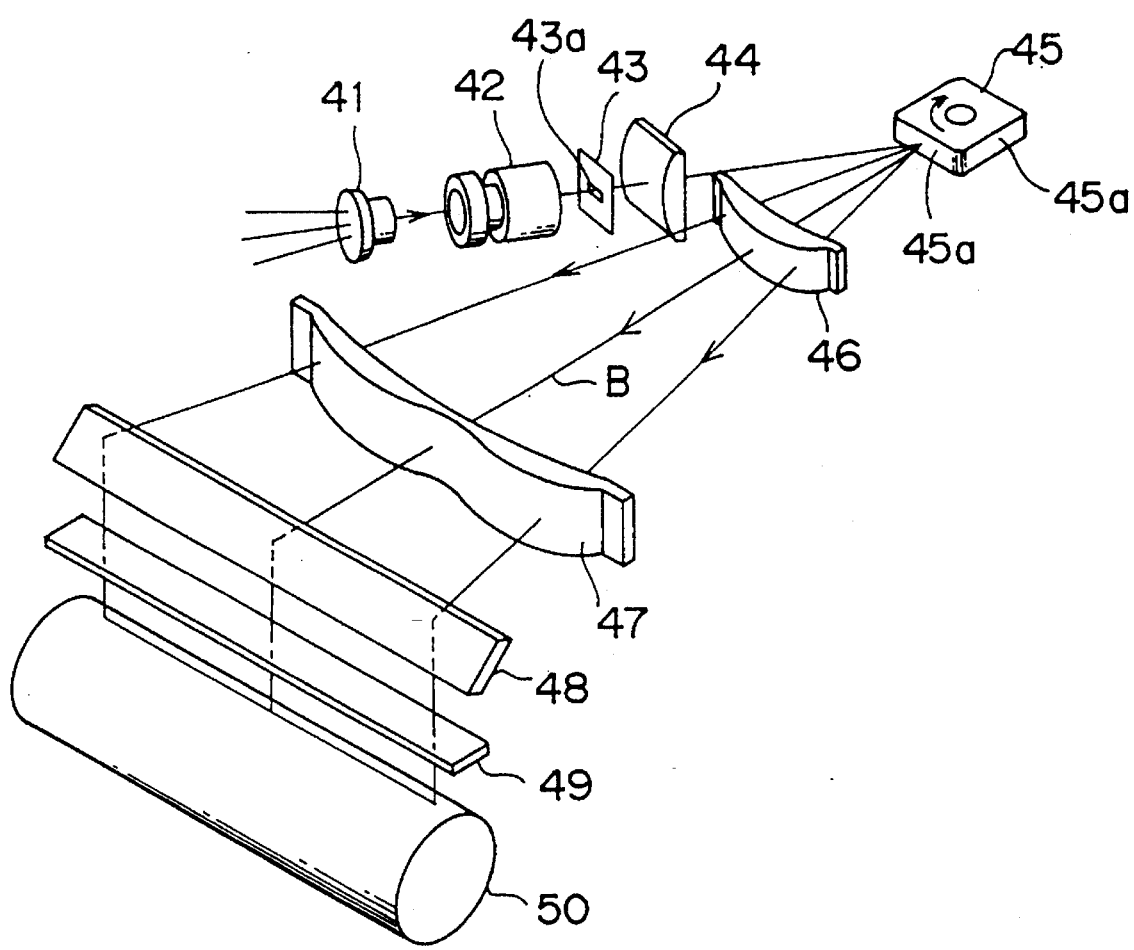
FIG. 7 is a perspective view of a laser beam optical scanning system which is a second embodiment of the present invention.
Figure 8:
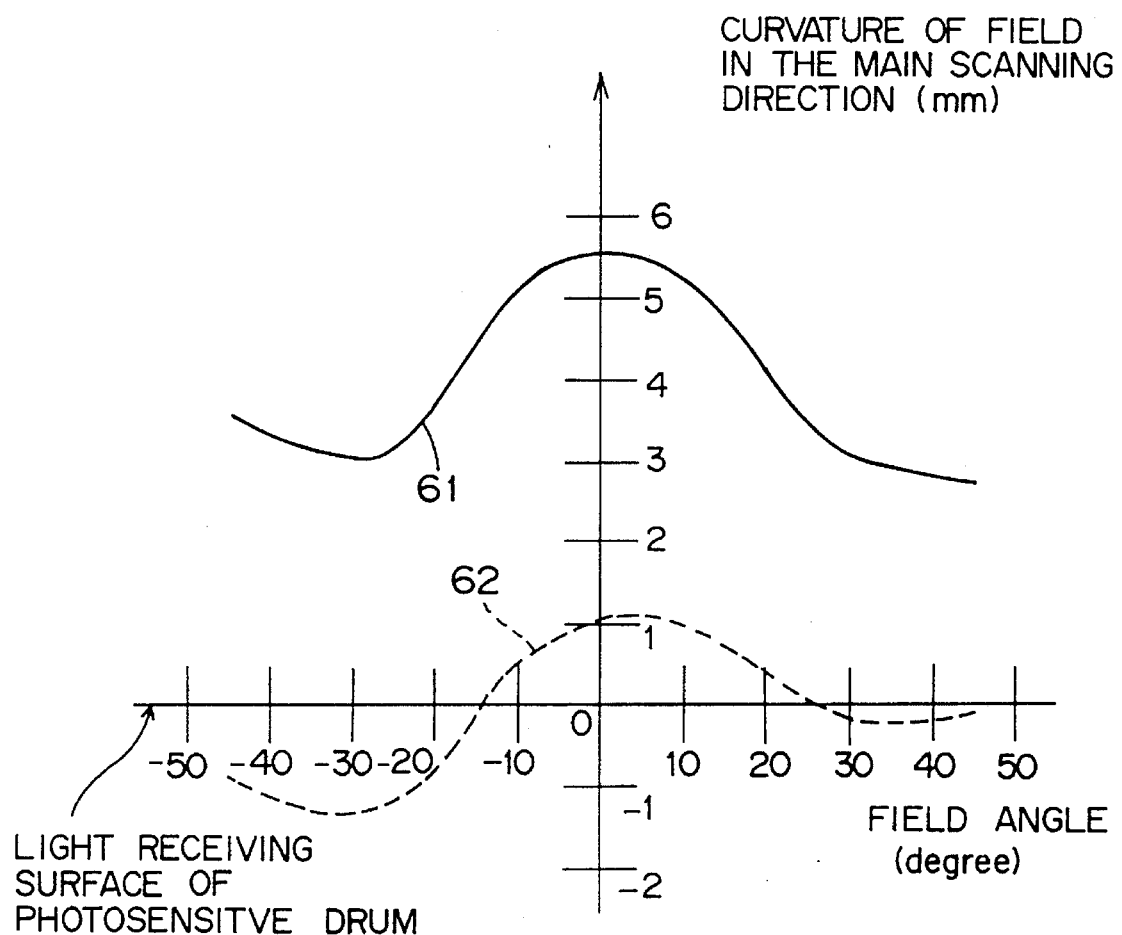
FIG. 8 is a graph showing curvature of field which occurs in the optical scanning system of the second embodiment while the polygonal scanner is stationary and curvature of field which occurs in the same optical scanning system while the polygonal scanner is rotating at a speed of 6000 rpm.

Second Embodiment: FIGS. 7 and 8

FIG. 7 shows the general structure of a laser beam optical scanning system which is a second embodiment. The laser beam optical scanning system comprises a laser diode 41, a collimator lens 42, a slit board 43, a cylindrical lens 44, a resin polygonal scanner 45, an aspherical lens 46, an aspherical toric lens 47 and a reflecting mirror 48. A laser beam emitted from the laser diode 41 passes through the collimator lens 42, a slit 43a made in the slit board 43 and the cylindrical lens 44, and is incident to the polygonal scanner 45. The polygonal scanner 45 is driven to rotate at a constant angular velocity, and the laser beam is deflected with the rotation of the polygonal scanner 45. The deflected laser beam passes through the aspherical lens 46, the aspherical toric lens 47 and is reflected by the reflecting mirror 48. Then, the laser beam passes through a cover glass 49 and is imaged on a light receiving surface of a photosensitive drum 50. The optical members 41 through 48 are well-known type, and the description thereof is omitted.

The polygonal scanner 45 has four reflective facets 45a and has the characteristics shown in Table 1 and Table 2 provided in the description of the first embodiment. Table 13 shows a preferred positional relation among the optical members 41 through 48 and the photosensitive drum 50 which makes the image surface during rotation of the polygonal scanner 45 come closer to the light receiving surface of the photosensitive drum 50. The data shown in Table 13 are values which were measured while the polygonal scanner 45 is stationary. While the polygonal scanner 45 is rotating at a speed of 6000 rpm, the radius of curvature of the reflective facets 45a of the polygonal scanner 45 is −45000 mm (see Table 1).

TABLE 13

| Elements | Radius of Curvature (mm) | | Distance (mm) | Refractive Index |
|---|---|---|---|---|
| | main scanning direction | sub scanning direction | | |
| cylindrical lens | infinite | 197 | 10 | 1.51072 |
| | | infinite | | |
| | | | 389 | 1.0 (air) |
| polygonal scanner | infinite (reflective facets) | | | |
| | | | 58 | 1.0 (air) |
| aspherical lens | −408 | | | |
| | | | 24 | 1.48495 |

TABLE 13-continued

| Elements | Radius of Curvature (mm) main scanning direction | Radius of Curvature (mm) sub scanning direction | Distance (mm) | Refractive Index |
|---|---|---|---|---|
| | | −105.2 | | |
| | | | 210 | 1.0 (air) |
| aspherical toric lens | −1900 | 32.15 | | |
| | | | 8 | 1.48495 |
| | 1300 | | | |
| | | | 78.4 | 1.0 (air) |
| photo-sensitive drum | | | | |

(for rotation of 6000 rpm, in a stationary state)

The light emergent side of the aspherical lens 46 and the light emergent side of the aspherical toric lens 47 are defined by the expression (1) provided in the description of the first embodiment. By substituting the following aspherical data (3) and (4), and −105.2 mm and 1300 mm, which are indicated in Table 13 as the radius of curvature ($1/C_o$) of the light emergent side of the lens 46 and that of the light emergent side of the lens 47 respectively, into the expression (1), the light emergent side of the aspherical lens 46 and the light emergent side of the aspherical toric lens 47 can be embodied.

$$\left.\begin{array}{l} \epsilon = 1 \\ A_4 = -0.11044 \times 10^{-8} \\ A_6 = -0.497259 \times 10^{-11} \\ A_8 = 0.164280 \times 10^{-17} \\ A_{10} = 0.730838 \times 10^{-23} \\ A_{12} = 0.985317 \times 10^{-29} \\ A_{14} = 0.102189 \times 10^{-34} \\ \text{The aspherical coefficients} \\ A_2 \text{ through } A_{16} \text{ other than} \\ \text{the above are 0.} \end{array}\right\} \quad (3)$$

$$\left.\begin{array}{l} \epsilon = 1 \\ A_4 = -0.256872 \times 10^{-7} \\ A_6 = 0.305191 \times 10^{-12} \\ A_8 = -0.327873 \times 10^{-17} \\ A_{10} = 0.105790 \times 10^{-22} \\ A_{12} = 0.276855 \times 10^{-27} \\ A_{14} = -0.495188 \times 10^{-32} \\ \text{The aspherical coefficients} \\ A_2 \text{ through } A_{16} \text{ other than} \\ \text{the above are 0.} \end{array}\right\} \quad (4)$$

The light incident side of the aspherical toric lens 47 is defined by the following expressions (5), (6), (7), (8), (9) and (10).

$$x = \frac{\kappa y^2}{1 + \sqrt{1 - \mu \kappa^2 y^2}} + \rho + A_{ij} \quad (5)$$

$$\kappa = \frac{K}{1 - K\rho} \quad (6)$$

$$\rho = \frac{C\zeta^2}{1 + \sqrt{1 - \epsilon C^2 \zeta^2}} \quad (7)$$

$$\zeta = z - S \quad (8)$$

$$S = \frac{C_{sy}^2}{1 + \sqrt{1 - \epsilon_s C_s^2 y^2}} + \sum_{j=2}^{8} s_j |y|^j \quad (9)$$

$$A_{ij} = \sum_{i=0}^{16} \left( \sum_{j=0}^{8} a_{ij} |y|^j \right) |\zeta|^i \quad (10)$$

$$a_{oo} \equiv 0$$

$$a_{i1} \equiv 0$$

$$a_{ij} \equiv 0$$

x: position in a direction of the optical axis
y: position in the main scanning direction
z: position in the sub scanning direction
K: curvature in the main scanning direction
C: curvature in the sub scanning direction
μ: quadratic curve parameter in the main scanning direction
ε: quadratic curve parameter in the sub scanning direction
$A_{ij}$: aspherical additional term By substituting the following aspherical data (11), and −1900 mm and 32.15 mm, which are indicated in Table 13 as the radius of curvature of the light incident side in the main scanning direction (1/K) and that in the sub scanning direction (1/C) of the aspherical toric lens 47, into the expressions (5) through (10), the light incident side of the aspherical toric lens 47 can be embodied.

$$\left.\begin{array}{l} \epsilon = 1 \\ \mu = 1 \\ \epsilon_s = 1 \\ C_s = 0 \\ A_{22} = a_{22} = -0.12 \times 10^{-6} \\ \text{The other aspherical additional} \\ \text{terms } A_{ij} \text{ are all 0.} \end{array}\right\} \quad (11)$$

Further, the position of the collimator lens 42 is adjusted such that the object distance between the reflective facets 45a of the polygonal scanner 45 and an object point S1 in the main scanning direction will be −17196 mm. If the laser beam incident to the polygonal scanner 45 is a parallel pencil of rays, the object distance is infinite. If the laser beam incident to the polygonal scanner 45 is a divergent pencil of rays, the object distance is indicated with a negative value, and if the laser beam is a convergent pencil of rays, the object distance is indicated with a positive value. Therefore, in the optical scanning system wherein the object distance is −17196 mm, the laser beam emitted from the laser diode 41 is incident to the polygonal scanner 45 as a slightly divergent pencil of rays. The laser beam is reflected by the reflective facets 45a of the polygonal scanner 45. While the polygonal scanner 45 is stationary, the reflected laser beam is incident to the aspherical lens 46 as a slightly divergent pencil of rays. Accordingly, in this state, the image surface is located behind the light receiving surface of the photosensitive drum 50 in the direction of the optical axis. While the polygonal scanner 45 is rotating at a speed of 6000 rpm, the reflective facets 45a of the polygonal scanner 45 are distorted to be concave, and the laser beam reflected by the reflective facets 45a is incident to the aspherical lens 46 as a parallel pencil of rays. Accordingly, the image surface shifts along the optical axis and comes closer to the light receiving surface of the photosensitive drum 50.

Table 14 and Table 15 show curvature of field which occurs in the optical scanning system of the second embodiment while the polygonal scanner 45 is stationary and while the polygonal scanner 45 is rotating at a speed of 6000 rpm respectively.

TABLE 14

| Field Angle (degrees) | Curvature of Field in the Sub Scanning Direction (mm) | Curvature of Field in the Main Scanning Direction (mm) |
|---|---|---|
| −45.00 | 0.3310 | 3.6325 |
| −36.00 | −1.7150 | 3.1909 |
| −27.00 | −1.2481 | 3.0839 |
| −18.00 | 0.2791 | 4.1585 |
| −9.00 | 1.8013 | 5.2469 |
| 0.00 | 2.4228 | 5.5937 |
| 9.00 | 1.8067 | 5.2779 |
| 18.00 | 0.3258 | 4.3358 |
| 27.00 | −1.0952 | 3.3194 |
| 36.00 | −1.3655 | 3.0615 |
| 45.00 | 1.0269 | 2.7721 |

(for rotation of 6000 rpm, in a stationary state)

TABLE 15

| Field Angle (degrees) | Curvature of Field in the Sub Scanning Direction (mm) | Curvature of Field in the Main Scanning Direction (mm) |
|---|---|---|
| −45.00 | 0.3396 | −0.8345 |
| −36.00 | −1.7143 | −1.1957 |
| −27.00 | −1.2493 | −1.2732 |
| −18.00 | 0.2779 | −0.3556 |
| −9.00 | 1.8009 | 0.6091 |
| 0.00 | 2.4227 | 1.0286 |
| 9.00 | 1.8063 | 0.9999 |
| 18.00 | 0.3248 | 0.4965 |
| 27.00 | −1.0962 | −0.0882 |
| 36.00 | −1.3647 | −0.0790 |
| 45.00 | 1.0343 | −0.1386 |

(in a state of 6000 rpm rotation)

FIG. 8 is a graph drawn from the data about the curvature of field in the main scanning direction provided in Table 14 and Table 15. In FIG. 8, the solid line 61 shows the curvature of field while the polygonal scanner 45 is stationary, and the dashed line 62 shows the curvature of field while the polygonal scanner 45 is rotating at a speed of 6000 rpm.

As is apparent from FIG. 8, the curvature of field in the main scanning direction is large while the polygonal scanner 45 is stationary, and when the polygonal scanner 45 is driven to rotate, the curvature of field becomes small. The difference is approximately 4 mm. On the other hand, the curvature of field in the sub scanning direction is always small whether the polygonal scanner 45 is stationary or is rotating (see Table 14 and Table 15). Thus, in the laser beam optical scanning system of the second embodiment, when the polygonal scanner 45 is driven for image formation, the curvature of field becomes small enough such that an image of high quality with no jitter can be obtained.

For comparison, the following describes an optical scanning system wherein its optical elements are positioned such that the image surface is very near the light receiving surface of the photosensitive drum 50 while the polygonal scanner 45 is stationary. Table 16 shows the positional relation among the optical members of this optical scanning system. Data provided in Table 16 are values which were measured while the polygonal scanner 45 is stationary. While the polygonal scanner 45 is rotating at a speed of 6000 rpm, the radius of curvature of the reflective facets 45a of the polygonal scanner 45 becomes −45000 mm (see Table 1).

TABLE 16

| Elements | Radius of Curvature (mm) | | Distance (mm) | Refractive Index |
|---|---|---|---|---|
| | main scanning direction | sub scanning direction | | |
| cylindrical lens | infinite | 197 | 10 | 1.51072 |
| | | infinite | 380 | 1.0 (air) |
| polygonal scanner | infinite (reflective facets) | | | |
| | | | 58 | 1.0 (air) |
| aspherical lens | −408 | | | |
| | | −105.2 | 24 | 1.48495 |
| | | | 210 | 1.0 (air) |
| aspherical toric lens | −1900 | 32.15 | | |
| | | | 8 | 1.48495 |
| | 1300 | | | |
| | | | 78.4 | 1.0 (air) |
| photosensitive drum | | | | |

(comparative example, in a stationary state)

As is apparent from Table 13 and Table 16, in the comparative example, the cylindrical lens 44 is positioned mm closer to the polygonal scanner 45 than that in the second embodiment. Further, in the comparative example, the collimator lens 42 is positioned such that the object distance between the reflective facets 45a of the polygonal scanner 45 and an object point S1 will be infinite. In the structure, the laser beam is incident to the polygonal scanner 45 as a parallel pencil of rays. While the polygonal scanner 45 is stationary, the laser beam is reflected by the reflective facet 45a and is incident to the aspherical lens 46 as a parallel pencil of rays. Accordingly, the image surface in this state is located substantially on the light receiving surface of the photosensitive drum 50. While the polygonal scanner 45 is rotating at a speed of 6000 rpm, the reflective facets 45a of the polygonal scanner 45 are distorted to be concave, and the laser beam reflected by the reflective facets 45a is incident to the aspherical lens 46 as a slightly convergent pencil of rays. Accordingly, the image surface shifts toward the polygonal scanner 45 and comes before the light receiving surface of the photosensitive drum 50.

Table 17 and Table 18 show curvature of field which occurs in the optical scanning system of the comparative example shown in Table 16 while the polygonal scanner 45 is stationary and while the polygonal scanner 45 is rotating at a speed of 6000 rpm respectively.

TABLE 17

| Field Angle (degrees) | Curvature of Field in the Sub Scanning Direction (mm) | Curvature of Field in the Main Scanning Direction (mm) |
|---|---|---|
| −45.00 | 0.3817 | 0.0532 |
| −36.00 | −1.6674 | −0.6472 |
| −27.00 | −1.1995 | −1.0191 |
| −18.00 | 0.3303 | −0.3666 |
| −9.00 | 1.8551 | 0.3452 |
| 0.00 | 2.4775 | 0.5502 |
| 9.00 | 1.8605 | 0.3749 |
| 18.00 | 0.3771 | −0.1970 |
| 27.00 | −1.0465 | −0.7987 |

TABLE 17-continued

| Field Angle (degrees) | Curvature of Field in the Sub Scanning Direction (mm) | Curvature of Field in the Main Scanning Direction (mm) |
|---|---|---|
| 36.00 | −1.3176 | −0.7995 |
| 45.00 | 1.0781 | −0.8405 |

(comparative example, in a stationary state)

TABLE 18

| Field Angle (degrees) | Curvature of Field in the Sub Scanning Direction (mm) | Curvature of Field in the Main Scanning Direction (mm) |
|---|---|---|
| −45.00 | 0.3903 | −4.4097 |
| −36.00 | −1.6666 | −4.9979 |
| −27.00 | −1.2008 | −5.3103 |
| −18.00 | 0.3291 | −4.7811 |
| −9.00 | 1.8547 | −4.1684 |
| 0.00 | 2.4775 | −3.8854 |
| 9.00 | 1.8601 | −3.7885 |
| 18.00 | 0.3760 | −3.9514 |
| 27.00 | −1.0476 | −4.1545 |
| 36.00 | −1.3167 | −3.9139 |
| 45.00 | 1.0855 | −3.7481 |

(comparative example, in a state of 6000 rpm rotation)

As is apparent from Table 17 and Table 18, the curvature of field in the main scanning direction is small while the polygonal scanner 45 is stationary, and when the polygonal scanner 45 rotates, that is, when the polygonal scanner 4 is driven for image formation, the curvature of field becomes larger. In other words, the performance of this optical scanning system is not sufficient to form an image of good quality with no jitter.

Third Embodiment: FIGS. 9–12

It has been known that a resin polygonal scanner which has five or more reflective facets, during its rotation, is distorted such that the reflective facets become convex. A third embodiment is a laser beam optical scanning system provided with such a polygonal scanner.

Figure 9:
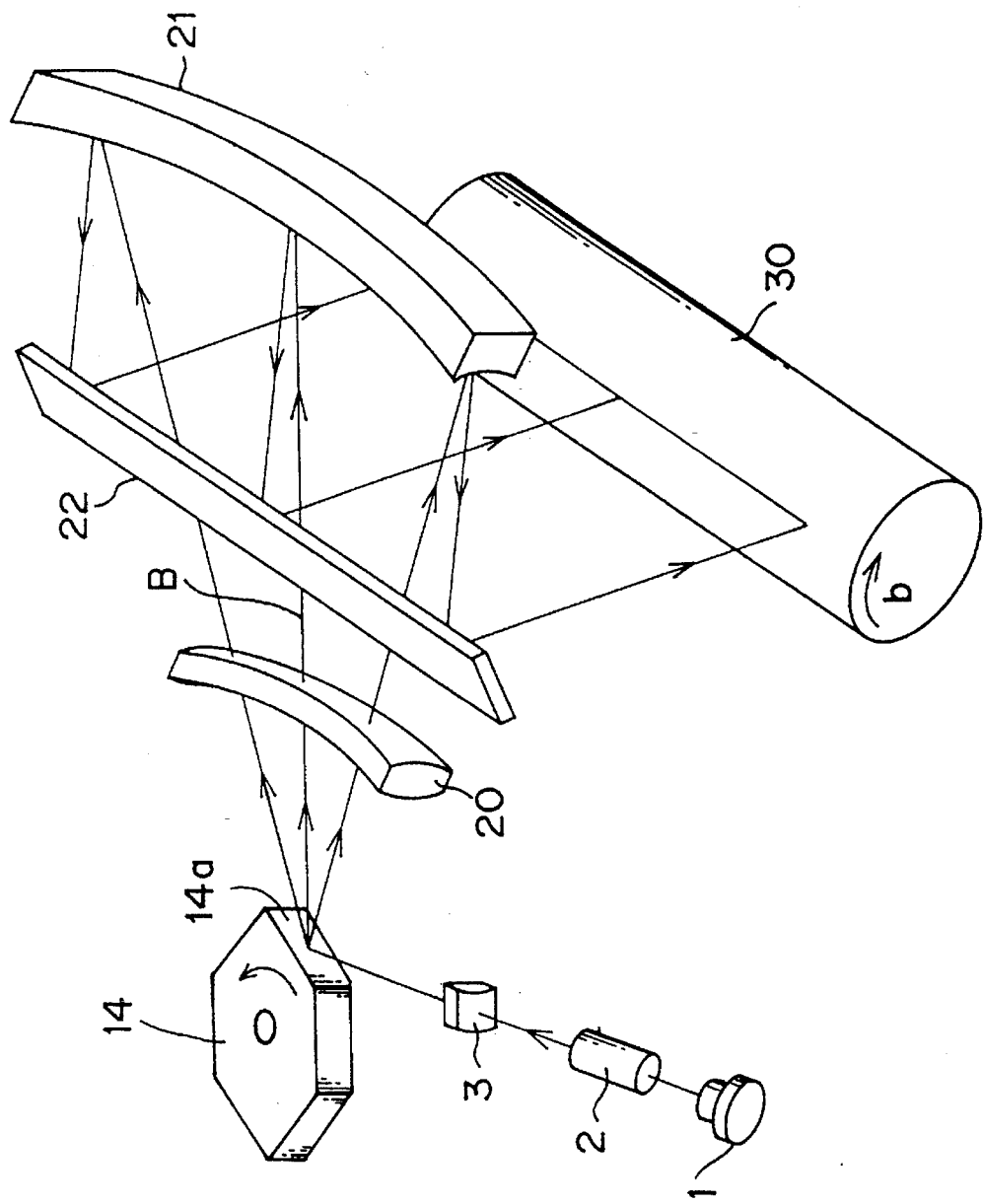
FIG. 9 is a perspective view of a laser beam optical scanning system which is a third embodiment of the present invention.

FIG. 9 shows the general structure of the optical scanning system. The optical scanning system has a polygonal scanner 14 which has six reflective facets 14a. The other members are the same as those of the optical scanning system shown in FIG. 1, and these same members are provided with the same reference numbers and marks.

As shown in FIG. 10, the polygonal scanner 14 has a shape indicated with the solid line while it is stationary, and when the polygonal scanner 14 is driven to rotate, it is distorted as indicated with the dashed line. The distortion was simulated by the finite element method, and the result is indicated in Table 19 as the radius of curvature of the reflective facets 14a. Table 19 also shows the characteristics of the material used for the simulation.

TABLE 19

| Material | polycarbonate |
|---|---|
| Young's Modulus | 210 kg/mm$^2$ |
| Specific Gravity | 1.2 |
| Poisson's Ratio | 0.35 |
| Radius of Inscribed Circle | 30 mm |

TABLE 19-continued

| Material | polycarbonate |
|---|---|
| Rotating Speed | 15000 rpm |
| Radius of Curvature of Reflective Facets | 22500 mm |

The convex distortion of the reflective facets 14a influences the location of the image surface in the main scanning direction most as the cases of the first and the second embodiments. More specifically, each of the reflective facets 14a, when it is distorted to be convex, obtains a negative power in the main scanning direction. Accordingly, the laser beam reflected by the convex reflective facets 14a becomes a slightly divergent pencil of rays, and consequently, the image surface in the main scanning direction shifts in the plus direction. This phenomenon is opposite to those in the first embodiment and in the second embodiment. Distortion of the image surface caused by the convex distortion of the reflective facets 14a can be calculated beforehand, and an f θ system shall be designed to have a power in the opposite direction to offset the distortion.

Table 20 shows a preferred positional relation among the elements of the optical scanning system of the third embodiment and the photosensitive drum 30 which makes the image surface during rotation of the polygonal scanner 14 (15000 rpm) come closer to the light receiving surface of the photosensitive drum 30.

The data shown in Table 20 are values which were measured while the polygonal scanner 14 is stationary. While the polygonal scanner 14 is rotating at a speed of 15000 rpm, the radius of curvature of the reflective facets 14a of the polygonal scanner 14 is 22500 mm (see Table 19).

TABLE 20

| Elements | Radius of Curvature (mm) main scanning direction | Radius of Curvature (mm) sub scanning direction | Distance (mm) | Refractive Index |
|---|---|---|---|---|
| laser diode | | | 0.48 | 1.0 (air) |
| | infinite | | | |
| cover glass of laser diode | | | 0.25 | 1.5112 (glass) |
| | infinite | | | |
| | | | 5.866 | 1.0 (air) |
| | infinite | | | |
| collimator lens | | | 2.8 | 1.7857 (SF6) |
| | | −6.286 | | |
| | | | 219.58 | 1.0 (air) |
| | infinite | 14.54 | | |
| cylindrical lens | | | 1.5 | 1.4846 (AC) |
| | | infinite | | |
| | | | 28.1 | 1.0 (air) |
| polygonal scanner | infinite (reflective facets) | | | |
| | | | 40 | 1.0 (air) |
| | −50.96 | 29.25 | | |
| toric lens | | | 8 | 1.4846 (AC) |
| | | −54.56 | | |
| | | | 95 | 1.0 (air) |
| spherical mirror | −480 (reflective surface) | | | |

TABLE 20-continued

| Elements | Radius of Curvature (mm) | | Distance (mm) | Refractive Index |
|---|---|---|---|---|
| | main scanning direction | sub scanning direction | | |
| photo-sensitive drum | | | 165 | 1.0 (air) |

(for rotation of 15000 rpm, in a stationary state)

The light emergent side of the collimator lens 2 is defined by the expression (1). By substituting the following aspherical data (12) and −6.286 mm, which is indicated in Table 20, into the expression (1), the emergent side of the collimator lens 2 can be embodied.

$$\left.\begin{array}{l} \epsilon = 1 \\ A_4 = 0.3270 \times 10^{-3} \\ A_6 = 0.6675 \times 10^{-5} \\ A_8 = 0.1087 \times 10^{-6} \\ A_{10} = 0.2354 \times 10^{-8} \\ \text{The aspherical coefficients} \\ A_2 \text{ through } A_{16} \text{ other than} \\ \text{the above are all 0.} \end{array}\right\} \quad (12)$$

In the optical scanning system shown in Table 20, the toric lens 20 is set such that the vertex of its light incident side is −0.2 mm out of the optical axis in the main scanning direction and that the vertex of its light emergent side is −0.5 mm out of the optical axis in the main scanning direction and −9 mm out of the optical axis in the sub scanning direction. Further, the spherical mirror 21 is set such that the vertex of its reflective surface is −10.3 mm out of the optical axis in the main scanning direction.

Next, the operation and effect of the laser beam optical scanning system which has optical positioning shown by Table 20 is described.

The laser beam is incident to the polygonal scanner 14 as a slightly divergent pencil of rays. While the polygonal scanner 14 is stationary, the image surface is located before the light receiving surface of the photosensitive drum 30 in the direction of the optical axis. When the polygonal scanner 14 rotates at a speed of 15000 rpm, the reflective facets 14a of the polygonal scanner 14 are distorted to be convex, and the laser beam reflected by the reflective facets 14a further diverges. Accordingly, the image surface shifts toward the photosensitive drum 30 along the optical axis and comes closer to the light receiving surface of the photosensitive drum 30.

Figure 11:
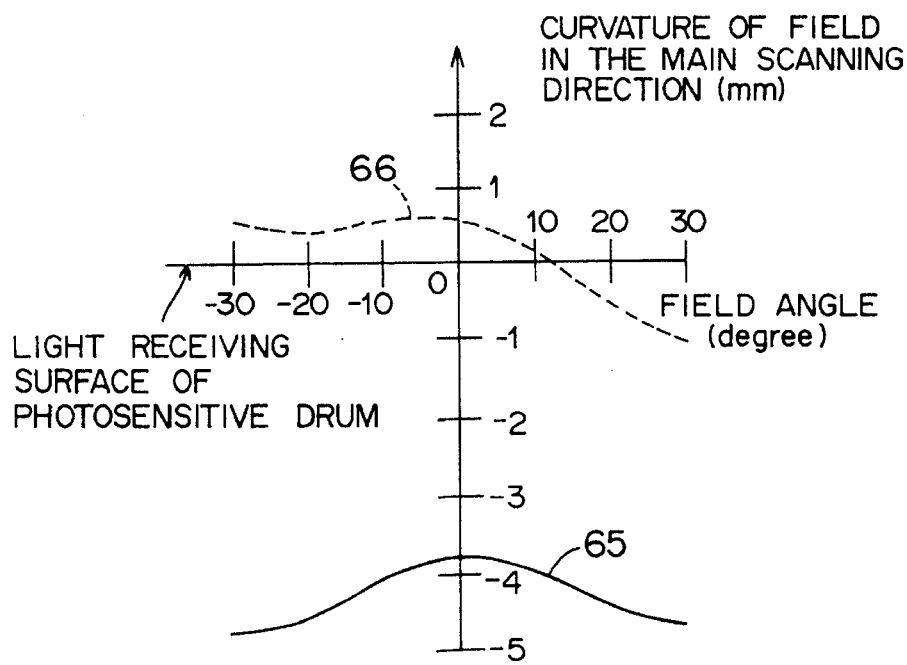
FIG. 11 is a graph showing curvature of field which occurs in the optical scanning system of the third embodiment while the polygonal scanner is stationary and curvature of field which occurs in the same optical scanning system while the polygonal scanner is rotating at a speed of 15000 rpm.

FIG. 11 shows curvature of field which occurs in the optical scanning system of this third embodiment. In FIG. 11, the solid line 65 shows the curvature of field while the polygonal scanner 14 is stationary, and the dashed line 66 shows the curvature of filed while the polygonal scanner 14 is rotating at a speed of 15000 rpm. As is apparent from FIG. 11, while the polygonal scanner 14 is stationary, the image surface in the main scanning direction is distant from the light receiving surface in the minus direction, and when the polygonal scanner 14 is driven to rotate, the image surface comes closer to the light receiving surface.

For comparison, the following describes an optical scanning system wherein the optical elements are positioned such that the image surface will be substantially on the light receiving surface of the photosensitive drum 30 while the polygonal scanner 14 is stationary. Table 21 shows the positional relation among the optical elements of this optical scanning system. Data provided in Table 21 are values which were measured while the polygonal scanner 14 is stationary. While the polygonal scanner 14 is rotating at a speed of 15000 rpm, the radius of curvature of the reflective facets 14a is 22500 mm (see Table 19).

TABLE 21

| Elements | Radius of Curvature (mm) | | Distance (mm) | Refractive Index |
|---|---|---|---|---|
| | main scanning direction | sub scanning direction | | |
| laser diode | | | 0.48 | 1.0 (air) |
| | infinite | | | |
| cover glass of laser diode | | | 0.25 | 1.5112 (glass) |
| | infinite | | | |
| | | | 5.862 | 1.0 (air) |
| | infinite | | | |
| collimator lens | | | 2.8 | 1.7857 (SF6) |
| | −6.286 | | | |
| | | | 219.48 | 1.0 (air) |
| | infinite | 14.54 | | |
| cylindrical lens | | | 1.5 | 1.4846 (AC) |
| | infinite | | | |
| | | | 28.2 | 1.0 (air) |
| polygonal scanner | infinite (reflective facets) | | | |
| | | | 40 | 1.0 (air) |
| | −50.96 | 29.25 | | |
| toric lens | | | 8 | 1.4846 (AC) |
| | −54.56 | | | |
| | | | 95 | 1.0 (air) |
| spherical mirror | −480 (reflective surface) | | | |
| | | | 165 | 1.0 (air) |
| photo-sensitive drum | | | | |

(comparative example, in a stationary state)

In the optical scanning system of the third embodiment shown by Table 20, the collimator lens 2 is disposed a little farther from the laser diode 1 compared with that in the comparative example such that the divergence of the laser beam will be smaller. Further, the cylindrical lens 3 is disposed closer to the polygonal scanner 14 such that a shift of the image surface in the sub scanning direction caused by the change in the position of the collimator lens 2 can be corrected.

Figure 12:
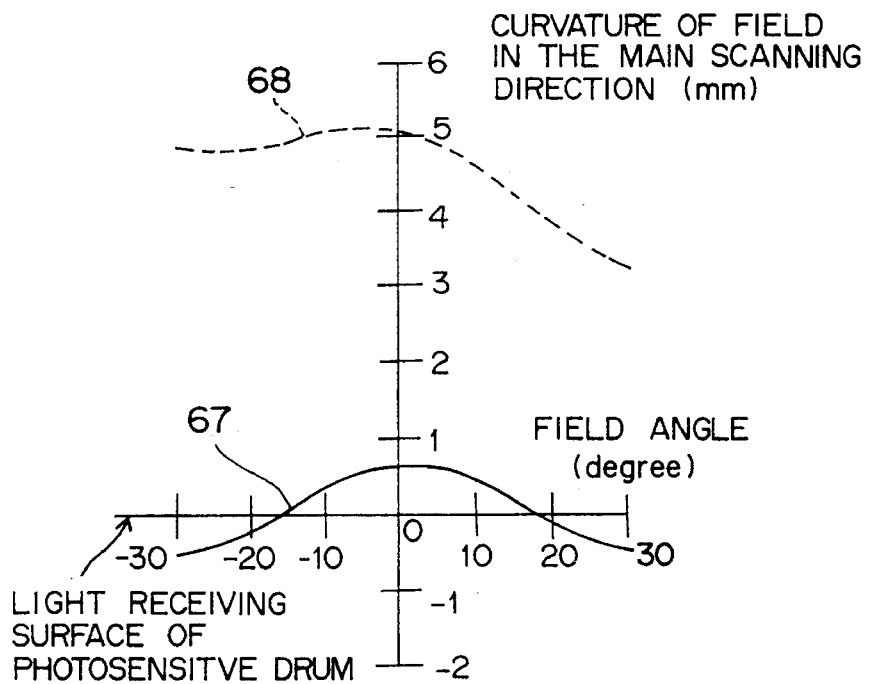
FIG. 12 is a graph showing curvature of field which occurs in an optical scanning system of a comparative example while the polygonal scanner is stationary and curvature of field which occurs in the same optical scanning system while the polygonal scanner is rotating at a speed of 15000 rpm.

FIG. 12 shows curvature of field in the main scanning direction which occurs in the optical scanning system (comparative example) shown by Table 21. In FIG. 12, the solid line 67 shows curvature of field while the polygonal scanner 14 is stationary, and the dashed line 68 shows curvature of field while the polygonal scanner 14 is rotating at a speed of 15000 rpm.

In the optical scanning system of the third embodiment and in the optical scanning system of the comparative example, there occur curvature of field and distortion in the sub scanning direction in almost the same degree.

Figure 13:
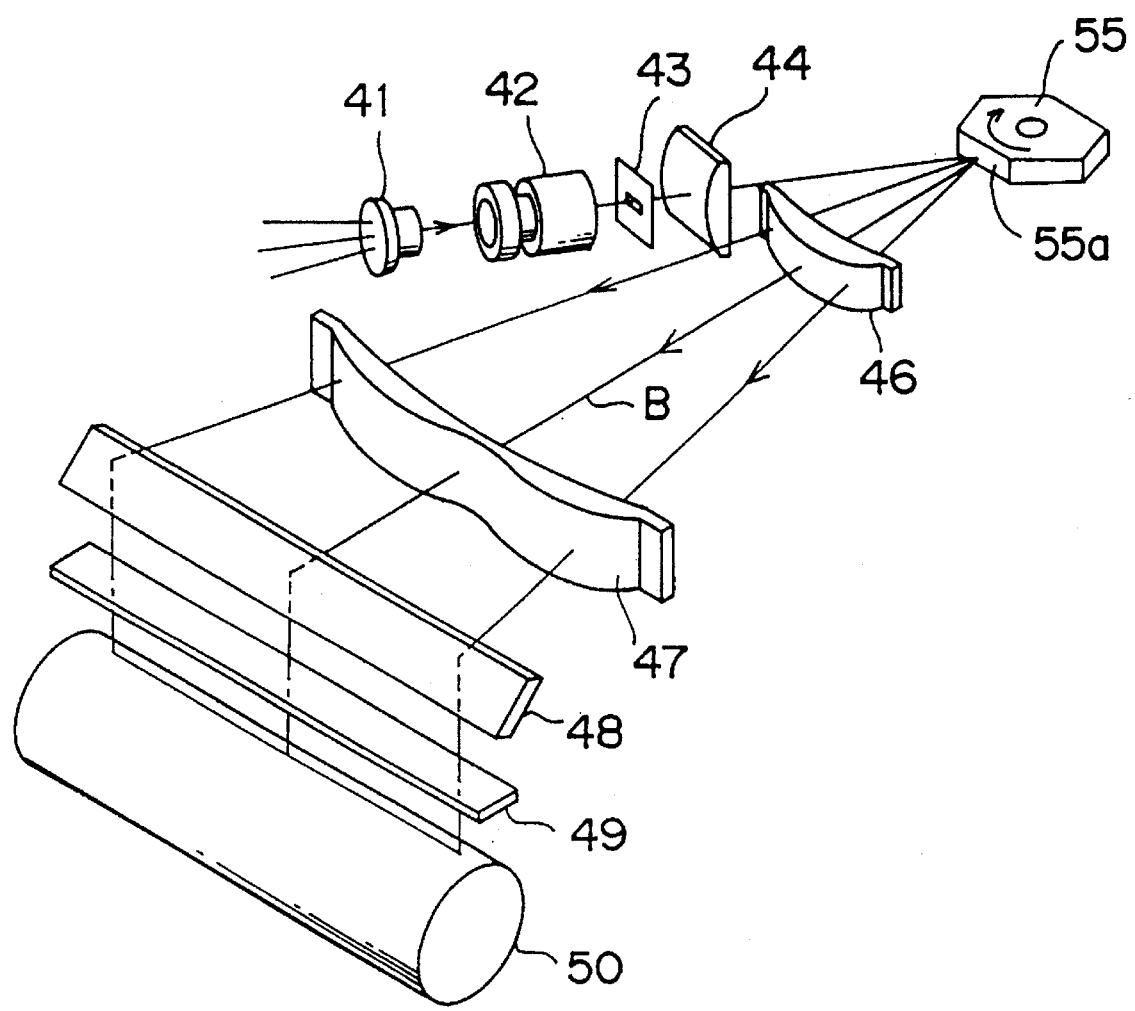
FIG. 13 is a perspective view of a laser beam optical scanning system which is a fourth embodiment of the present invention.
Figure 14:
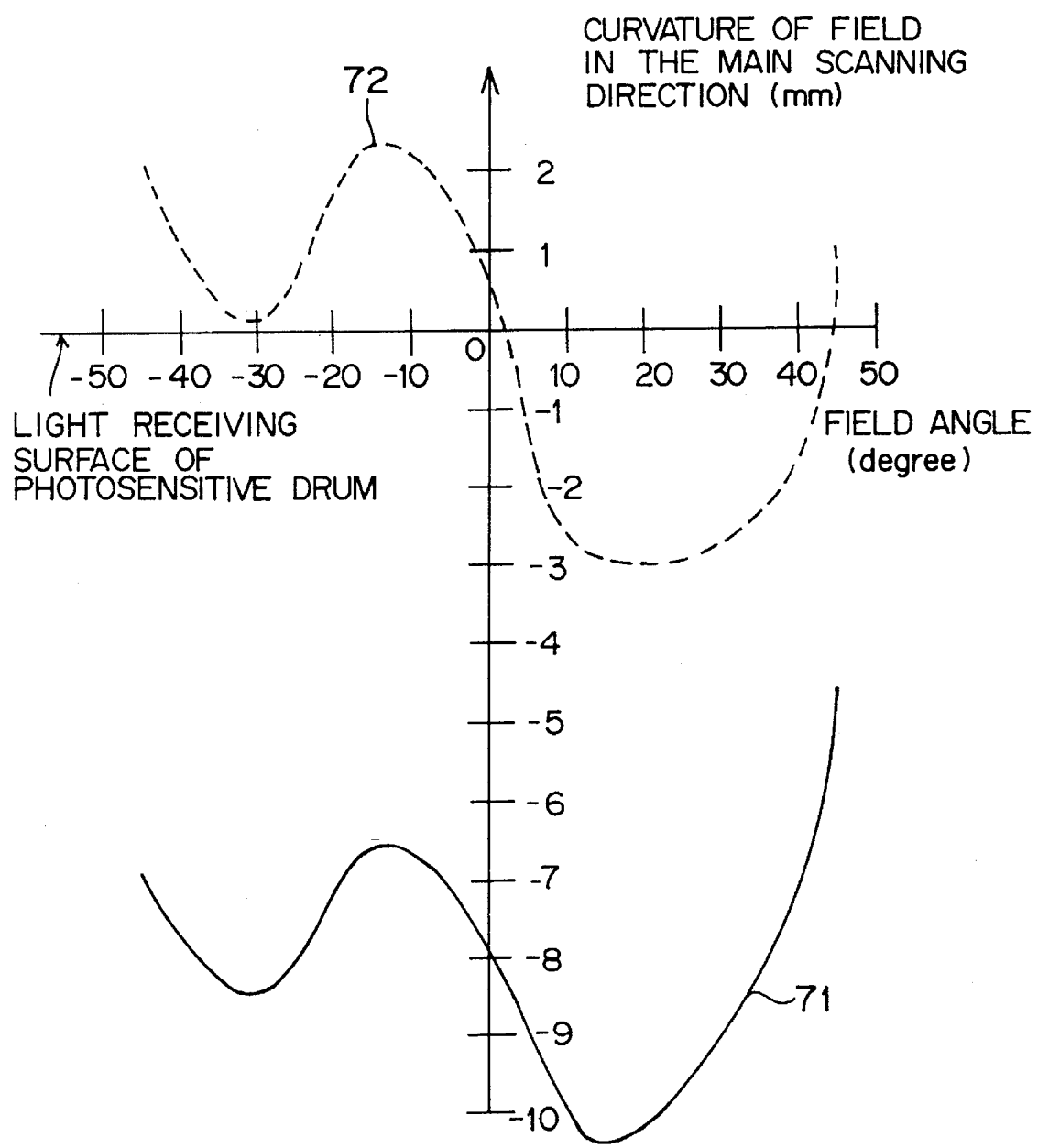
FIG. 14 is a graph showing curvature of field which occurs in the optical scanning system of the fourth embodiment while a polygonal scanner is stationary and curvature of field which occurs in the same optical scanning system while the polygonal scanner is rotating at a speed of 15000 rpm.

Fourth Embodiment: FIGS. 13–15

FIG. 13 shows a laser beam optical scanning system of a fourth embodiment. The optical scanning system has a polygonal scanner 55 whose reflective facets are distorted to be convex with rotation of the scanner 55. The general structure of the optical scanning system is almost the same as that of the second embodiment shown by FIG. 7, and the same members are provided with the same reference numbers and marks.

The polygonal scanner 55 has characteristics shown by Table 19. Table 22 shows a positional relation among the members 41 through 48 of the optical scanning system and a photosensitive drum 50 which makes the image surface be located near a light receiving surface of the photosensitive drum 50 during rotation of the polygonal scanner 55. Data provided in Table 22 are values which were measured while the polygonal scanner 55 is stationary. While the polygonal scanner 55 is rotating at a speed of 15000 rpm, the radius of curvature of its reflective facets is 22500 mm (see Table 19).

TABLE 22

| Elements | Radius of Curvature (mm) | | Distance (mm) | Refractive Index |
|---|---|---|---|---|
| | main scanning direction | sub scanning direction | | |
| | infinite | 197 | | |
| cylindrical lens | | | 10 | 1.51072 |
| | | infinite | | |
| | | | 380 | 1.0 (air) |
| polygonal scanner | | infinite (reflective facets) | | |
| | | | 58 | 1.0 (air) |
| aspherical lens | −408 | | | |
| | | | 24 | 1.48495 |
| | −103.5 | | | |
| | | | 210 | 1.0 (air) |
| aspherical toric lens | −1900 | 32.15 | | |
| | | | 8 | 1.48495 |
| | 1300 | | | |
| | | | 78.4 | 1.0 (air) |
| photo-sensitive drum | | | | |

(for rotation of 15000 rpm, in a stationary state)

The light emergent sides of the aspherical lens 46 and the aspherical toric lens 47 are defined by the expression (1) provided in the first embodiment. By substituting the following aspherical data (13) and (14), and −103.5 mm and 1300 mm, which are indicated in Table 22 as the radius of curvatures ($1/C_o$) of the light emergent sides of the lenses 46 and 47, into the expression (1), the light emergent sides of the aspherical lens 46 and the aspherical toric lens 47 can be embodied.

$$\left.\begin{array}{l} \epsilon = 0.6382 \\ A_4 = -0.51044 \times 10^{-8} \\ A_6 = -0.497259 \times 10^{-11} \\ A_8 = 0.164280 \times 10^{-17} \\ A_{10} = 0.730838 \times 10^{-23} \\ A_{12} = 0.985317 \times 10^{-29} \\ A_{14} = 0.102189 \times 10^{-34} \\ \text{The aspherical coefficients} \\ A_2 \text{ through } A_{16} \text{ other than} \\ \text{the above are all 0.} \end{array}\right\} \quad (13)$$

$$\left.\begin{array}{l} \epsilon = 1 \\ A_4 = -0.256872 \times 10^{-7} \\ A_6 = 0.305191 \times 10^{-12} \\ A_8 = -0.327873 \times 10^{-17} \\ A_{10} = 0.105790 \times 10^{-22} \\ A_{12} = 0.276855 \times 10^{-27} \\ A_{14} = -0.495188 \times 10^{-32} \\ \text{The aspherical coefficients} \\ A_2 \text{ through } A_{16} \text{ other than} \\ \text{the above are all 0.} \end{array}\right\} \quad (14)$$

The light incident side of the aspherical toric lens 47 is defined by the expressions (6), (7), (8), (9) and (10) provided in the third embodiment.

By substituting the following aspherical data (15), and −1900 mm and 32.15 mm, which are indicated in Table 22 as the radius of curvature in the main scanning direction (1/K) and the radius of curvature in the sub scanning direction (1/C) of the light incident side of the aspherical toric lens 47, into the expressions (5) through (10), the light incident side of the lens 47 can be embodied.

$$\left.\begin{array}{l} \epsilon = 1 \\ \mu = 1 \\ \epsilon_s = 1 \\ C_s = 0 \\ A_{22} = a_{22} = -0.12 \times 10^{-6} \\ \text{The other aspherical coefficients} \\ A_{ij} \text{ are all 0.} \end{array}\right\} \quad (15)$$

Further, the collimator lens 42 is positioned such that an object distance between a reflective facet 55a of the polygonal scanner 55 and an object point S1 in the main scanning direction will be −17196 mm. If the laser beam is incident to the polygonal scanner 55 as a parallel pencil of rays, the object distance is infinite. If the laser beam is incident to the polygonal scanner 55 as a divergent pencil of rays, the object distance is indicated as a negative value. If the laser beam is incident to the polygonal scanner 55 as a convergent pencil of rays, the object distance is indicated as a positive value. Accordingly, in this optical scanning system, since the object distance is −17196 mm, the laser beam emitted from the laser diode 41 is incident to the polygonal scanner 55 as a slightly divergent pencil of rays. While the polygonal scanner 55 is stationary, the laser beam is reflected by a reflective facet 55a of the scanner 55, and the reflected laser beam is incident to the aspherical lens 46 as an almost parallel pencil of rays. Then, the image surface is located before the light receiving surface of the photosensitive drum 50 in a direction of the optical axis. While the polygonal scanner 55 is rotating at a speed of 15000 rpm, the reflective facets 55a of the polygonal scanner 55 are distorted to be convex, and accordingly, the laser beam reflected from the reflective facets 55a is incident to the aspherical lens 46 as a slightly divergent pencil of rays. Thereby, the image surface shifts along the optical axis and comes closer to the light receiving surface of the photosensitive drum 50.

FIG. 14 shows curvature of field which occurs in the optical scanning system of the fourth embodiment. In FIG. 14, the solid line 71 shows curvature of field while polygonal scanner 55 is stationary, and the dashed line 72 shows curvature of field while the polygonal scanner 55 is rotating at a speed of 15000 rpm. As is apparent from FIG. 14, the image surface in the main scanning direction, while the polygonal scanner 55 is stationary, is displaced from the light receiving surface in the minus direction. However, when the polygonal scanner 55 is driven to rotate, the image surface comes closer to the light receiving surface of the photosensitive drum 50.

For comparison, the following describes an optical scanning system whose optical elements are positioned such that the image surface is located near the light receiving surface of the photosensitive drum 50 while the polygonal scanner 55 is stationary. In this optical scanning system, the optical elements has a positional relation shown by Table 23. Data provided in Table 23 are values which were measured while the polygonal scanner 55 is stationary. While the polygonal scanner 55 is rotating at a speed of 15000 rpm, the radius of curvature of its reflective facets 55a is 22500 mm (see Table 19).

TABLE 23

| Elements | Radius of Curvature (mm) | | Distance (mm) | Refractive Index |
| --- | --- | --- | --- | --- |
| | main scanning direction | sub scanning direction | | |
| cylindrical lens | infinite | 197 | | |
| | | | 10 | 1.51072 |
| | infinite | | | |
| | | | 380 | 1.0 (air) |
| polygonal scanner | infinite (reflective facets) | | | |
| | | | 58 | 1.0 (air) |
| aspherical lens | −408 | | | |
| | | | 24 | 1.48495 |
| | −105.2 | | | |
| | | | 210 | 1.0 (air) |
| aspherical toric lens | −1900 | 32.15 | | |
| | | | 8 | 1.48495 |
| | 1300 | | | |
| | | | 78.4 | 1.0 (air) |
| photo-sensitive drum | | | | |

(comparative example, in a stationary state)

In the comparative example, the collimator lens 42 is positioned such that an object distance between the reflective facets 55a and an object point S1 will be infinite. In other words, the laser beam is incident to the polygonal scanner 55 as a parallel pencil of rays. While the polygonal scanner 55 is stationary, the laser beam is reflected by a reflective facet 55a and is incident to the aspherical lens 46 as a parallel pencil of rays. Then, the image surface is located substantially on the light receiving surface of the photosensitive drum 50. While the polygonal scanner 55 is rotating at a speed of 15000 rpm, its reflective facets 55a are distorted to be convex, and the laser beam reflected therefrom is incident to the aspherical lens 46 as a slightly divergent pencil of rays. Thereby, the image surface shifts in the plus direction along the optical axis and comes behind the light receiving surface of the photosensitive drum 50.

FIG. 15 shows curvature of field in the main scanning direction which occurs in the optical scanning system shown by Table 23. In FIG. 15, the solid line 73 shows curvature of field while the polygonal scanner 55 is stationary, and the dashed line 74 shows curvature of field while the polygonal scanner 55 is rotating at a speed of 15000 rpm.

In the optical scanning system of the comparative example shown by Table 23 and in the optical scanning system of the fourth embodiment shown by Table 22, there occur curvature of field and distortion in the sub scanning direction in almost the same degree.

Incidentally, in the third embodiment and in the fourth embodiment, the positions of the beam waists are adjusted such that an image of high quality with no jitter can be obtained in spite of the distortion of the polygonal scanner 14 or 55. The adjustment, as in the first and the second embodiments, is carried out by moving the collimator lens 2 or 42 and the cylindrical lens 3 or 44, which are in the object side of the polygonal scanner 14 or 55, along the optical axis. This adjustment does not interfere with corrections to an error caused by misalignment of the reflective facets of the polygonal scanner 14 or 55. The adjustment is described in connection with the third embodiment. The reflective facets 14a of the polygonal scanner 14 are distorted to be convex with rotation of the polygonal scanner 14, and thereby, the beam waist in the main scanning direction shifts in the plus direction. In order to prevent this, the collimator lens 2 is moved in the plus direction, and thereby, the divergence of the laser beam incident to the reflective facets 14a of the polygonal scanner 14 becomes smaller. Accordingly, while the polygonal scanner 14 is stationary, the beam waist is located in the minus side of the light receiving surface, and when the polygonal scanner 14 is driven to rotate, the beam waist comes closer to the light receiving surface. Since the collimator lens 2 has not only a power in the main scanning direction but also a power in the sub scanning direction, the movement of the collimator lens 2 results in shifting the beam waist in the sub scanning direction. In order to offset the shift of the beam waist in the sub scanning direction, the cylindrical lens 3, which has only a power in the sub scanning direction, is moved along the optical axis.

Thus, if the position of the beam waist in the main scanning direction is adjusted by moving a lens which is located in the object side of the polygonal scanner 14 and has a power in the sub scanning direction as well as a power in the main scanning direction, the position of the beam waist in the sub scanning direction is adjusted preferably by moving a lens which is located in the object side of the polygonal scanner 14 and has only a power in the sub scanning direction. If the cylindrical lens 3 is positioned such that the beam waist in the sub scanning direction will be located substantially on the light receiving surface, the laser beam emergent from the cylindrical lens 3 will be imaged substantially on the reflective facets 14a of the polygonal scanner 14, and thus, an error caused by misalignment of the reflective facets 14a will be sufficiently corrected.

When the reflective facets of the polygonal scanner are distorted to be convex with rotation of the polygonal scanner, each of the reflective facets has a larger power toward a laser beam at a field angle of 30 degrees than toward a laser beam at a field angle of −30 degrees, that is, each of the reflective facets converges the laser beam at a field angle of 30 degrees more strongly than the laser beam at a field angle of −30 degrees. Accordingly, the beam waist of the laser beam at a field angle of 30 degrees is located in the minus side of the beam waist of the laser beam at a field angle of −30 degrees. This is apparent from the dashed line 74 in FIG. 15. In order to correct the inclination of the image surface, in the optical scanning system of the fourth embodiment shown by Table 22, the aspherical lens 46 and the aspherical toric lens 47 are decentered toward the side from which the laser beam is incident to the polygonal scanner 55. More specifically, the aspherical lens 46 is disposed such that the vertex of its light incident side is −5 mm distant from the optical axis, and the aspherical toric lens 47 is disposed such that the vertex of its light emergent side is −5 mm distant from the optical axis.

With this arrangement, while the polygonal scanner 55 is stationary, the beam waist of the laser beam at a field angle of 30 degrees is located in the plus side of the beam waist of the laser beam at a field angle of −30 degrees (see the solid line 71 in FIG. 14), and this offsets the shift of the beam waist of the laser beam at a field angle of 30 degrees in the minus direction during rotation of the polygonal scanner 55 (see the dashed line 72 in FIG. 14). In other words, the laser beam at a field angle of 30 degrees is converged in the main scanning direction less strongly than the laser beam at a field angle of −30 degrees such that the beam waists of the laser beams will not be displaced from the image surface so largely. The larger the angle between a laser beam incident to a reflective facet and the laser beam reflected therefrom is, the smaller the positive power acting on the laser beam in the main scanning direction is.

Other Embodiments

Although the present invention has been described in connection with the preferred embodiments above, it is to be noted that various changes and modifications are possible to those who are skilled in the art. Such changes and modifications are to be understood as being within the scope of the invention.

The number of reflective facets of a polygonal scanner is at least one, and may be two or eight as well as four and six. As the material of the polygonal scanner, not only the material described in connection with the embodiments but also polystyrene, acrylonitrile styrene copolymer, tetrapolymethylene pentene and such resin processed by aroylation can be used. Further, even a metal polygonal scanner is distorted like a resin polygonal scanner when it rotates at extremely a high speed, and the arrangements described in the embodiments may be necessary in an optical scanning system which has a metal polygonal scanner.

Another way of adjusting the laser beam optical scanning system so as to form an image of high quality with no jitter in spite of distortion of the polygonal scanner is providing a concave lens between the cylindrical lens and the polygonal scanner in a right position.

According to the embodiments above, the optical scanning system is designed in consideration of distortion of the reflective facets of the polygonal scanner, and when the reflective facets of the polygonal scanner are distorted with rotation of the polygonal scanner, the beam waists of laser beams in the main scanning direction come closer to the light receiving surface, and the inclination of the image surface becomes smaller. However, the following structures are also possible. The collimator lens is automatically moved along the optical axis in accordance with the field angle so as to correct the inclination of the image surface, and/or the collimator lens is automatically moved in accordance with the degree of distortion of the reflective facets of the polygonal scanner so as to adjust the positions of the beam waists in the main scanning direction.

Further, the present invention is applicable to an optical scanning system which has an f θ system comprising other types of lenses.

What is claimed is:

1. A laser beam optical scanning device comprising:

a laser diode for emitting a laser beam;

first optical means for converging the laser beam emitted from the laser diode;

a polygonal scanner having facets which is driven to rotate at a specified speed for deflecting the laser beam emergent from the first optical means, and of which the facets are configured to be planar while the polygonal scanner is stationary; and second optical means for directing the laser beam deflected by the polygonal scanner to a light receiving surface;

wherein a beam waist of the laser beam in a main scanning direction is located apart from the light receiving surface while the polygonal scanner is stationary and the beam waist is located adjacent to the light receiving surface while the polygonal scanner is driven to rotate at the specified speed due to distortion of the planar configuration of the facets.

2. A laser beam optical scanning device as claimed in claim 1, wherein the image surface is located before the light receiving surface while the polygonal scanner is stationary.

3. A laser beam optical scanning device as claimed in claim 2, wherein reflective facets of the polygonal scanner are distorted to be convex while the polygonal scanner is rotating.

4. A laser beam optical scanning device as claimed in claim 2, wherein the first optical means has at least a lens which has a power in a main scanning direction and a power in a sub scanning direction and a lens which has only a power in the sub scanning direction.

5. A laser beam optical scanning device as claimed in claim 2, wherein the second optical means acts with a stronger positive power in a main scanning direction on a laser beam which is incident to a reflective facet of the polygonal scanner and reflected therefrom at a larger angle.

6. A laser beam optical scanning device comprising:

a laser diode for emitting a laser beam;

a scanner having a plurality of deflecting facets which is driven to rotate at a predetermined speed so as to deflect the laser beam; and an optical imaging system for imaging the laser beam adjacent to a light receiving surface;

wherein:

each deflecting facet of said scanner is configured to be planar when stationary and not to be planar when rotated as a result of centrifugal forces created during rotation; and said optical imaging system is constructed so that a beam waist of the laser beam in a main scanning direction is located apart from the light receiving surface while said scanner is stationary and the beam waist is located closer to the light receiving surface while said scanner is rotated at the predetermined speed.

7. A laser beam optical scanning device for scanning a light receiving surface comprising:

a laser diode for emitting a laser beam;

first optical means for converging the laser beam emitted from the laser diode;

a polygonal scanner having reflective facet surfaces of a relatively flexible plastic resin, the polygonal scanner being driven about an axis of rotation at a predetermined speed for deflecting the laser beam emergent from the first optical means, the predetermined speed being sufficient to flex the reflective facet surfaces radially relative to the axis of rotation; and second optical means for providing an image surface, the second optical means having a stronger positive power in a main scanning direction than in a subscanning direction on a laser beam which is incident on a reflective facet surface and reflected therefrom at a larger angle relative to the rotation of the incident reflective facet surface about the rotational axis, wherein the image surface of the second optical means is located before the light receiving surface while the polygonal scanner is stationary and is displaced by the flexing of the reflective facet surfaces to shift toward the light receiving surface at the predetermined speed.

* * * * *